(12) United States Patent
Butler

(10) Patent No.: US 8,827,193 B2
(45) Date of Patent: Sep. 9, 2014

(54) CONTROLLED BUBBLE COLLAPSE MILLING

(75) Inventor: James Charles Butler, Cherry Hill, NJ (US)

(73) Assignee: B9 Plasma, Inc., Mount Laurel, NJ (US)

( * ) Notice: Subject to any disclaimer, the term of this patent is extended or adjusted under 35 U.S.C. 154(b) by 291 days.

(21) Appl. No.: 13/076,360

(22) Filed: Mar. 30, 2011

(65) Prior Publication Data

US 2011/0272501 A1 Nov. 10, 2011

Related U.S. Application Data

(60) Provisional application No. 61/332,610, filed on May 7, 2010.

(51) Int. Cl.
*B02C 1/00* (2006.01)
*B02C 17/02* (2006.01)
*G05B 15/00* (2006.01)
*G05B 13/02* (2006.01)

(52) U.S. Cl.
CPC .............. *G05B 15/00* (2013.01); *G05B 13/024* (2013.01)
USPC .............................. 241/21; 241/24.13; 241/33

(58) Field of Classification Search
USPC .......................... 241/33–37, 21, 24.13, 24.25
See application file for complete search history.

(56) References Cited

U.S. PATENT DOCUMENTS

| | | | |
|---|---|---|---|
| 3,214,149 A | 10/1965 | Budzien | |
| 3,773,659 A | 11/1973 | Carlson et al. | |
| 3,779,469 A | 12/1973 | Putman | |
| 4,168,295 A | 9/1979 | Sawyer | |
| 4,378,290 A | 3/1983 | Kennedy, Jr. | |
| 4,744,956 A | 5/1988 | Yant et al. | |
| 4,752,399 A | 6/1988 | Viator et al. | |
| 4,755,201 A | 7/1988 | Eschwey et al. | |
| 5,020,731 A * | 6/1991 | Somoza et al. | 241/1 |
| 5,035,363 A * | 7/1991 | Somoza | 241/1 |
| 5,173,184 A | 12/1992 | Krieger | |
| 5,215,429 A | 6/1993 | Sun | |
| 5,238,578 A | 8/1993 | Rathsack | |
| 5,326,468 A * | 7/1994 | Cox | 210/96.1 |
| 5,332,356 A | 7/1994 | Gülich | |
| 5,393,417 A | 2/1995 | Cox | |
| 5,492,628 A | 2/1996 | Schutte | |
| 5,494,584 A | 2/1996 | McLachlan et al. | |

(Continued)

FOREIGN PATENT DOCUMENTS

| | | |
|---|---|---|
| CN | 101381150 A | 3/2009 |
| DE | 35 45 746 A1 | 6/1987 |
| WO | WO 02/066386 A1 | 8/2002 |
| WO | WO 2008/156795 A1 | 12/2008 |

OTHER PUBLICATIONS

Elsevier, Science B.V., Harada, "Sonochemical Reduction of Carbon Dioxide", Ultrasonics Sonochemistry 5 (1998) 73-77 (5 pages).

(Continued)

*Primary Examiner* — Faye Francis

(74) *Attorney, Agent, or Firm* — McCarter & English, LLP

(57) ABSTRACT

A system for processing ores is provided. The system includes a bubble collapse mill and a control system that interacts with an external system to evaluate and manipulate the processing of an ore.

8 Claims, 8 Drawing Sheets

(56) References Cited

U.S. PATENT DOCUMENTS

| | | | |
|---|---|---|---|
| 5,494,585 | A | 2/1996 | Cox |
| 5,659,173 | A | 8/1997 | Putterman et al. |
| 5,755,973 | A | 5/1998 | Krieger |
| 5,858,104 | A | 1/1999 | Clark |
| 5,931,771 | A | 8/1999 | Kozyuk |
| 5,947,299 | A | 9/1999 | Vazquez et al. |
| 5,997,590 | A | 12/1999 | Johnson et al. |
| 6,200,486 | B1 | 3/2001 | Chahine et al. |
| 6,277,332 | B1 | 8/2001 | Sucholeiki |
| 6,318,649 | B1 | 11/2001 | Mazurkiewicz |
| 6,527,960 | B1 | 3/2003 | Bacon et al. |
| 6,620,486 | B2 | 9/2003 | Kanematsu et al. |
| 6,627,784 | B2 | 9/2003 | Hudson et al. |
| 6,663,349 | B1 | 12/2003 | Discenzo et al. |
| 6,709,241 | B2 | 3/2004 | Sabini et al. |
| 6,908,559 | B2 | 6/2005 | Collings |
| 6,932,914 | B2 | 8/2005 | LeClair |
| 7,237,735 | B2 | 7/2007 | Tirschler |
| 7,247,244 | B2 | 7/2007 | Kozyuk |
| 7,380,975 | B2 | 6/2008 | Tessien |
| 7,404,666 | B2 | 7/2008 | Tessien |
| 7,416,671 | B2 | 8/2008 | Bozak et al. |
| 7,448,792 | B2 | 11/2008 | Tessien |
| 7,465,333 | B1 | 12/2008 | Halalay et al. |
| 7,559,241 | B2 | 7/2009 | Gunnerman |
| 7,585,665 | B2 | 9/2009 | Iiyama et al. |
| 7,677,790 | B2 | 3/2010 | Tessien |
| 7,736,518 | B2 | 6/2010 | Smith et al. |
| 7,749,468 | B2 | 7/2010 | Halalay |
| 7,762,715 | B2 | 7/2010 | Gordon et al. |
| 7,767,159 | B2 | 8/2010 | Glotov |
| 7,834,230 | B2 | 11/2010 | Fujimoto et al. |
| 7,842,121 | B2 | 11/2010 | Sanderson et al. |
| 2002/0054995 | A1 | 5/2002 | Mazurkiewicz |
| 2002/0064494 | A1 | 5/2002 | Zeng et al. |
| 2002/0096456 | A1 | 7/2002 | Kim et al. |
| 2003/0159456 | A1 | 8/2003 | Cowans |
| 2004/0173093 | A1 | 9/2004 | Takahashi |
| 2006/0156924 | A1 | 7/2006 | Tessien |
| 2006/0159557 | A1 | 7/2006 | Tessien |
| 2006/0159558 | A1 | 7/2006 | Tessien |
| 2006/0159559 | A1 | 7/2006 | Tessien |
| 2006/0159560 | A1 | 7/2006 | Tessien |
| 2006/0251554 | A1 | 11/2006 | Doucet et al. |
| 2007/0002996 | A1 | 1/2007 | Neifeld |
| 2007/0089566 | A1 | 4/2007 | Hackl et al. |
| 2007/0145168 | A1 | 6/2007 | Theberge et al. |
| 2007/0231242 | A1 | 10/2007 | Wilson |
| 2007/0290380 | A1 | 12/2007 | Avrillier et al. |
| 2008/0078518 | A1* | 4/2008 | Goto et al. ............... 162/189 |
| 2008/0197218 | A1 | 8/2008 | Ishigaki et al. |
| 2008/0212398 | A1 | 9/2008 | Tessien |
| 2009/0000941 | A1 | 1/2009 | Kropf |
| 2009/0145843 | A1 | 6/2009 | Ahner |
| 2009/0159461 | A1 | 6/2009 | McCutchen et al. |
| 2009/0188157 | A1 | 7/2009 | Holloway, Jr. et al. |
| 2009/0293679 | A1 | 12/2009 | Singh et al. |
| 2010/0193370 | A1 | 8/2010 | Olah et al. |
| 2010/0320155 | A1 | 12/2010 | Enos et al. |
| 2011/0147231 | A1 | 6/2011 | Gordon et al. |
| 2011/0186256 | A1 | 8/2011 | Mikkonen et al. |
| 2012/0000997 | A1* | 1/2012 | Ha et al. ..................... 241/1 |
| 2012/0055884 | A1 | 3/2012 | Chen et al. |
| 2012/0070315 | A1 | 3/2012 | Butler |
| 2012/0071702 | A1 | 3/2012 | Butler |

OTHER PUBLICATIONS

International Search Report mailed May 25, 2011, issued in connection with International Application No. PCT/US11/30610 (3 pages).
Written Opinion mailed May 25, 2011, issued in connection with International Application No. PCT/US11/30610 (5 pages).
International Search Report mailed Oct. 16, 2012, issued in connection with International Application No. PCT/US11/052828 (3 pages).
Written Opinion mailed Oct. 16, 2012, issued in connection with International Application No. PCT/US11/052828 (5 pages).
Written Opinion mailed Jun. 14, 2012, issued in connection with International Application No. PCT/US11/30610 (3 pages).
Roth Pump Company, "Regenerative Turbine Chemical Pumps for the Process Industry", Bulletin [online], Nov. 21, 2008 [retrieved by the ISA on Feb. 14, 2012]. Retrieved from the Internet: <URL: http://www.rothpukmp.com/Media/chemical.pdf> pp. 2, 6 (31 pages).
Elsevier Science Ltd., Chemical Engineering Science, Moholkar et al., "Numerical investigations in the behavior of one-dimensional bubbly flow in hydrodynamic cavitation", Dec. 2001 [retrieved by the ISA on Feb. 14, 2012]. Retrieved from the Internet: <URL http://144.206.159.178/ft/158/35028/599714.pdf> pp. 1411-1412. (8 pages).
Summary of Goldspan Resources, Inc.—Yahoo! Finance, "Form 8-K for Goldspan Resources, Inc.—Entry into a Material Definitive Agreement, Financial Statements and Exhibits", Mar. 30, 2010 (3 pages).
International Preliminary Report on Patentability mailed Sep. 28, 2012, issued in connection with International Application No. PCT/US11/30610 (75 pages).
International Search Report mailed Dec. 3, 2012, issued in connection with International Application No. PCT/US12/052568 (5 pages).
Written Opinion mailed Dec. 3, 2012, issued in connection with International Application No. PCT/US12/052568 (7 pages).
U.S. Appl. No. 13/595,946, entitled System and Method for Processing Aqueous Solutions, filed Aug. 27, 2012 (108 pages).
U.S. EPA website, Climate Change-Greenhouse Gas Emissions page, http://www.epa.gov/climatechange/ghgemissions/gases/co2.html (first date of publication unknown, known to inventor as early as Sep. 21, 2011) (3 pages).
National Oceanic and Atmospheric Administration PMEL website, Carbon Program, Ocean Carbon Update page, http://www.pmel.noaa.gov/c02/story/Ocean+Carbon+Uptake (first date of publication unknown, known to inventor as early as Sep. 21, 2011) (6 pages).
National Oceanic and Atmospheric Administration PMEL website, Carbon Program, Ocean Acidification page, http://www.pmel.noaa.gov Ic021 story/Ocean+ Acidification (first date of publication unknown, known to inventor as early as Sep. 21, 2011) (6 pages).
International Search Report of the International Searching Authority mailed Apr. 23, 2013, issued in connection with International Application No. PCT/US11/52806 (3 pages).
International Written Opinion of the International Searching Authority mailed Apr. 23, 2013, issued in connection with International Application No. PCT/US11/52806 (7 pages).
Franc. J., Physics and Control of Cavitation, In Design and Analysis of High Speed Pumps. Educational Notes RTO-EN-AVT-143. Dec. 2006 <URL: http://ftp.rta.nato.int/public//PubFullText/RTO/EN/RTO-EN-AVT-143///EN-AVT-143 02.pdf> pp. 2-15 to 2-17 (36 pages).
Li. Y. et al., Utilization of Carbon Dioxide From Coal-Fired Power Plant for the Production of Value-Added Products, Apr. 27, 2006 [retrieved on Feb. 14, 2012]. Retrieved from the Internet:<URL:http://moritz.botany.ut.ee/-olli/b/RepYuLi06.pdf> (109 pages).
Restriction Requirement dated Feb. 26, 2013, from U.S. Appl. No. 13/240,836 (9 pages).
Office Action dated Jun. 19, 2013, from U.S. Appl. No. 13/240,836 (17 pages).
Restriction Requirement dated Jan. 2, 2014, from U.S. Appl. No. 13/595,946 (6 pages).
Final Office Action dated Jan. 24, 2014, from U.S. Appl. No. 13/240,836 (9 pages).
Colombian Office Action dated Jan. 2, 2014, from Colombian Patent Application No. 12-202595, including English translation (24 pages).
Australian Patent Examination Report No. 1 issued Dec. 20, 2013, from Australian Patent Application No. 2011305368 (5 pages).
Australian Patent Examination Report No. 1 issued Jan. 9, 2014, from Australian Patent Application No. 2011305294 (3 pages).

* cited by examiner

CONTROLLED BUBBLE COLLAPSE MILLING

CROSS-REFERENCE TO RELATED APPLICATION

This application claims the benefit of U.S. Provisional Application No. 61/332,610, filed May 7, 2010, the disclosure of which is incorporated herein by reference in its entirety.

FIELD OF THE INVENTION

The present invention relates primarily to the art of gold, silver and precious metal ore assaying and cavitational or bubble collapse milling. In particular, the present invention relates to a control system for cavitational or bubble collapse milling of ore matrix compounds.

BACKGROUND OF THE INVENTION

Various methods can be employed to extract precious metals, such as gold and silver, from ores. One such extraction method involves the use of a lixiviant, such as a cyanide-based substance. However, refractory precious metal ores are often encased in a matrix that is resistant to such lixiviants. Gold, silver and precious metal ores containing micron scale or smaller sized particulate gold, silver or other precious metal encased in an extraction lixiviant-resistant mineral matrix often have yields too low for cost effective implementation.

SUMMARY OF THE INVENTION

The present invention relates to an apparatus that encompasses several independent subsystems to provide the features and functions described hereinafter. The present invention additionally relates to an ore amenability testing methodology using the aforementioned apparatus.

In general, the present invention relates to a computer-controlled aqueous solution cavitational or bubble collapse mill used to implement, test, measure, optimize and scale to production capacity, cavitational or bubble collapse milling and the consequential catalyzed chemical degradation of gold, silver and precious metal bearing ores. The present invention includes a test protocol that compares the amount of gold, silver and precious metal contained within and extractable or separable from a particular ore before and after ore preparation and cavitational or bubble collapse milling with the apparatus of the present invention.

One aspect of the present invention provides apparatus and methods to reduce gold or silver bearing ore median particle sizes from ~180 μm-~500 μm to ~35 μm or less as required by a particular ore metal extraction method. Cavitational or bubble collapse milling efficiently fractures, erodes, and/or degrades the encasing mineral matrix, partially exposing or totally freeing encapsulated particles of gold or silver, permitting lixiviant compounds to act on the intended extractable metal. In this way, an existing or contemplated hydrometallurgic or lixiviant based extraction, floatation, concentration or separation method determined ineffective for use on a particular ore can be successfully utilized after processing with the apparatus of the present invention and method.

A system for processing ores is provided. The system includes a bubble collapse mill sized to process an ore by reducing the particle size of the ore, and at least one sensor downstream of the bubble collapse mill, the sensor sensing at least one process parameter associated with operation of the bubble collapse mill. The system also includes a controller in communication with the at least one sensor, the controller receiving the at least one process parameter, processing the at least one process parameter, and adjusting operation of the bubble collapse mill based upon processing of the at least one process parameter.

A method for controlled slurry mixing is provided. A liquid is introduced into an open mixer, and the liquid is circulated through the open mixer using a circulation pump. The pressure or flow rate of the liquid is monitored using a controller and at least one sensor in communication with the controller. A determination is made as to whether the pressure or flow rate is within an acceptable range using the controller. If the pressure or flow rate is within the acceptable range, a desired amount of ore pulp is added to the open mixer to form a slurry. The slurry is mixed and recirculated for a pre-determined period of time using the circulation pump, and a parameter of the slurry is monitored using the controller and the at least one sensor. If the controller determines that the parameter is within an acceptable range, mixing and recirculating of the slurry is stopped.

A method for bubble collapse milling is provided. A slurry including ore particulates is pumped into a bubble collapse mill, and the bubble collapse mill is activated to process the slurry. The slurry is recirculated through the bubble collapse mill at a controlled pressure using a circulation pump, and a process parameter associated with processing of the slurry is monitored using a controller and at least one sensor. The operation of the bubble collapse mill is adjusted based upon monitoring of the parameter.

A method for batch-mode bubble collapse milling is provided. A desired batch of slurry including ore particulates is transfilled from a mixer into a bubble collapse mill, and the bubble collapse mill is activated to process the slurry. A process parameter associated with processing of the slurry is monitored using a controller and at least one sensor, and the operation of the bubble collapse mill is adjusted based upon monitoring of the parameter.

A method for sorting minerals is provided. A slurry containing minerals is pumped into a bubble collapse mill, and the bubble collapse mill is operated at a first state. A process parameter associated with operation of the mill is monitored using a controller and a sensor connected to the controller, and the operation of the bubble collapse mill is stopped if the controller determines that the process parameter falls within an acceptable range. A first batch of minerals is extracted from the bubble collapse mill, and the bubble collapse mill is operated at a second state having greater energy than the first state. The process parameter associated with operation of the mill is monitored using the controller and the sensor, and the operation of the bubble collapse mill is stopped if the controller determines that the process parameter falls within an acceptable range. A second batch of minerals is extracted from the bubble collapse mill having hardnesses greater than hardnesses of the first batch of minerals.

To achieve the aforementioned and other related purposes, the present invention includes the components and possesses the features hereinafter described in detail.

The following description, with attached figures, provides a detailed description of the setup, calibration, configuration and operation of the apparatus of the present invention as well as a description of an ore milling efficacy test protocol implementing the apparatus of the present invention. It is noted, however, that the present invention has other useful and novel aspects apart from those discussed. These additional aspects and advantages of the present invention will become apparent when considering together the following detailed description and drawings.

BRIEF DESCRIPTION OF THE DRAWINGS

For a more complete understanding of the present invention, reference is made to the following Detailed Description of the Invention, considered in conjunction with the accompanying drawings, in which.

DETAILED DESCRIPTION OF THE INVENTION

Figure 1A:
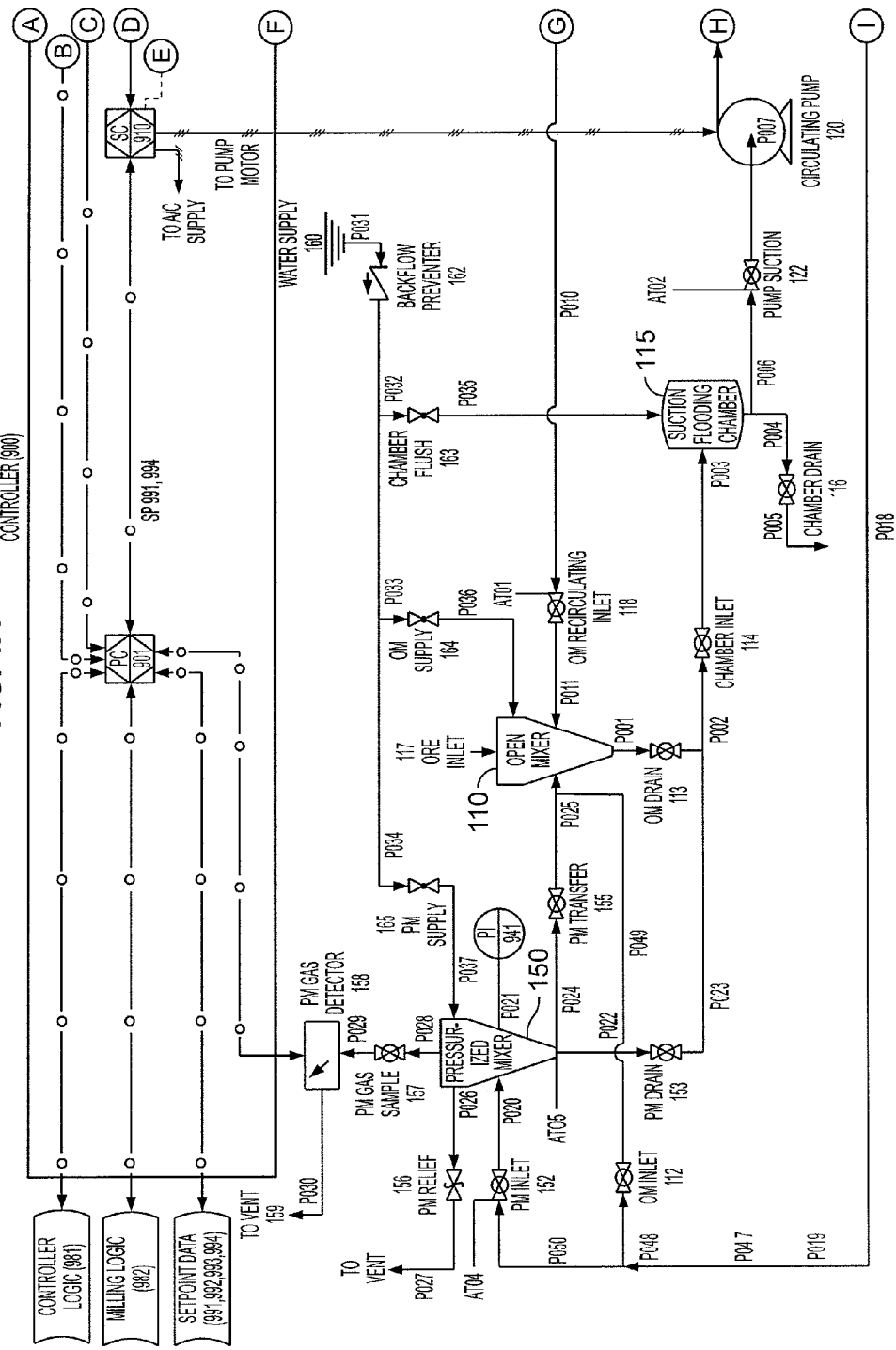
FIGS. 1A-1B are a piping and instrumentation diagram depicting an implementation of the apparatus of the present invention, illustrating a pump system, subsystems, components and a controller used to prepare, mix and mill gold, silver and precious metal ores, in accordance with several aspects of the present invention.

The present invention relates to a cavitational or bubble collapse mill apparatus comprised of several independent subsystems that, together, provide for controlled mixing of materials containing precious metal ore with an aqueous solution or water and subsequent controlled cavitational or bubble collapse milling of the ore until it reaches a final size required for effective precious metal separation, lixiviant extraction, floatation or other post milling recovery or concentration processes. For example, P85 ore particulate (a particulate wherein 85% of particles pass through the specified size of a sieve) approximately 180 micrometers to 500 micrometers (~180 µm to ~500 µm) could be mixed with an aqueous solution or water into a 1% to 25% solids slurry and subsequent cavitational or bubble collapse milling of the P85 ore particulate until it reaches a P85 of <35 µm for effective precious metal separation.

As used herein, a bubble collapse mill broadly refers to a cavitation mill, an ultrasound mill, a hydrodynamic mill, or any other type of mill or chamber that generates and collapses bubbles. Likewise, as used herein, bubble collapse milling broadly refers to cavitational milling, milling that involves ultrasound, hydrodynamic cavitation, mechanical milling, or any other milling that generates and collapses bubbles. Hydrodynamic cavitation can be created as a result of a pressure variation, cyclonic or tornadic flow, use of a vortex fitting, use of a venturi, use of zone pressure control, use of a pressure regulating valve or an orifice or restrictive fitting, or use of surface velocity changes in a laminar flow, etc. The cavitation or bubble collapse could be based on a combination of hydrodynamic and ultrasound, where, for example, the hydrodynamic component is created with a vortex fitting. It is desirable that the bubbles are created around particles.

The apparatus provides subsystems and components to externally measure and control bubble collapse milling process variables, such as mill slurry feedstock density and flow rate, mill delivery pressure, mill temperature, mill power consumption, mill effluent step down pressure, mill and post milling reactor gas pressure and mill and post milling reactor gas concentration as required by the milling subsystem employed for effective milling performance.

The present invention provides a bubble collapse mill with design features, component selections and deployment strategies that can be used across the full spectrum of possible implementation scales, including bench scale, pilot scale or pilot plant scale as well as full production scale with processing capacities in excess of hundreds of tons of gold, silver or precious metal ore per day. The functions of the present invention can be componentized and isolated into stand-alone subsystems to provide independent, linear or near linear scalability of the components included in a particular subsystem. In addition, the subsystems of the present invention are controlled and integrated by an independent integration and control subsystem. In this way, individual subsystem apparatus selections can be substituted with other functionally equivalent apparatus of larger capacity or that provide additional features and functions, to provide for overall capacity scale up or feature or function upgrade may be performed in a modular, readily testable fashion that permits both planned and on-the-fly (dynamically) subsystem or component swap-out and trials.

The individual subsystem designs, component selections and layouts of the apparatus of the present invention enable implementation of the invention's design across the full spectrum of possible mill capacities, including as required for the testing described hereinafter and for large scale production. The control and system integration subsystem design of the apparatus of the present invention can employ additional sensors or other condition detection and control subsystems or components, that might be required to process a specific ore at a particular rate or at a particular scale or with a subset of auxiliary feature or functions provided. In this way, changes to the present invention as required to adapt or implement it for a particular scale or ore's characteristics, or to adapt or add particular functional capacities to the apparatus of the present invention, as required, is intrinsically enabled and simplified.

The operational configurations of the apparatus can be modified to enable continuous recirculation, inline or batch processing. The apparatus has several configurations providing ore processing and milling support operations, including slurry mixing, mixture degassing, gas testing, gas concentration control, total power measurement and control, bubble collapse mill power measurement and control, as well as apparatus for full recovery of all solids, liquids and gasses added to or evolved during ore processing and other features related to, in support of, or in addition to the primary milling function. Post milling process operations, such as extraction, floatation, separation or concentration can be supported by the present invention's functions and components.

In addition, the present invention relates to sample preparation and suggested analytical methods to evaluate and optimize the performance of the bubble collapse milling method implemented using the apparatus of the present invention.

Figure 1B:
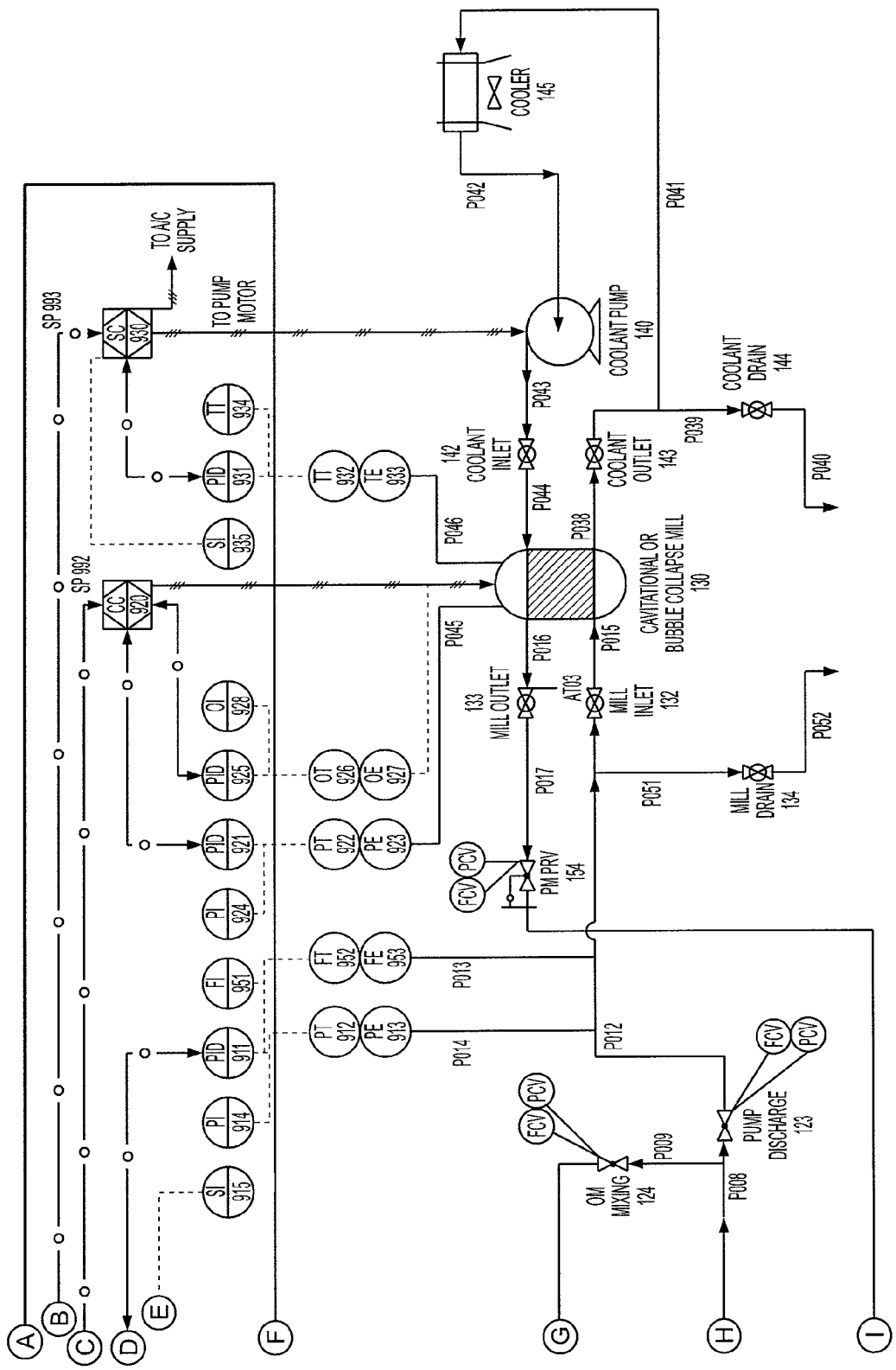

FIGS. 1A-1B depict an exemplary piping and instrumentation layout of the apparatus of the present invention and its subsystems.

The apparatus has at least four separate operational configurations, at least one for each of the following tasks:

Slurry Mixing—Ambient pressure and temperature mixing of particulate ore with water or other reagents, solvents, lixiviants, solids or liquids.

Bubble Collapse Milling With Low Pressure Circulation—Pressure and flow regulated bubble collapse milling followed by ambient pressure, ambient temperature, and flow regulated recirculation.

Bubble Collapse Milling With Regulated Pressure Circulation—Temperature, pressure and flow regulated bubble collapse milling followed by temperature, pressure and flow regulated recirculation through a pressure regulated vessel with degassing and gas testing capacity.

Batch Bubble Collapse Milling—Batch temperature, pressure and flow controlled milling terminating in a pressure regulated receiver with degassing and gas testing capacity.

The aforementioned alternate operation configurations can be provided to allow ore preparation, mixing, separation and processing using a variety of process conditions as controlled by one of several possible process variables. The apparatus of the present invention provides both automatic and manual selection and control of process variables in each of the configurations. In addition, the physical configuration of the present invention can be changed or modified from one of the aforementioned configurations to another or to any possible hybrid configuration state before, during or after apparatus operations. In this way, test protocol execution support, including support for alternate methods or alternate configurations to those shown and discussed herein, and operation optimizations, can be possible during system operation.

Use of the Apparatus of the Present Invention During Slurry Mixing—Referring to FIGS. 1A-1B, specific reference is made to the following components of the subsystem: open mixer 110, suction flooding chamber 115, circulating pump 120, and controller 900. Proceeding from the apparatus inlets downstream following the direction of flow, the aqueous solution, water, solvent, lixiviant or other supply liquid flows from the water supply 160 thru the inlet pipes P031, P032, P033, P036 of the backflow preventer 162 and the open mixer 110 as controlled by open mixer supply valve 164, filling the open mixer 110 as required with a specified volume or weight of liquid. Alternately, a measured or premixed amount of water or other solvent, solution or lixiviant can be added directly to the open mixer 110 through the ore inlet 117, or an automatic level control system (not shown) implementing a float switch or valve, or an optical or some other level detection and control system could be used to control the open mixer 110 initial water or solution charge. First, the open mixer drain valve 113 is closed, and then filling of the open mixer 110 can begin. Once the required amount of liquid is present in the open mixer 110, the slurry mixing cycle is started prior to adding any ore, solids or other reagents to the water or solution. To begin the mixing cycle, the pressurized mixer drain valve 153, the chamber drain valve 116, the pump discharge valve 123, the chamber flush valve 163 and the open mixer supply valve 164 are closed to isolate the recirculation circuit of the open mixer 110. The open mixer drain valve 113, the chamber inlet valve 114, the pump suction valve 122, the open mixer mixing valve 124 and the open mixer recirculating inlet valve 118 are opened to permit flow from the open mixer 110 through the inlet pipes P001, P002, and P003 to the suction flooding chamber 115. Flow continues through inlet pipes P004, P006 and P007 to the inlet of the circulating pump 120. Once the circulating pump 120 is started, recirculation flow begins through discharge pipes P008, P009, P010 and P011 back to the open mixer 110. An example of a suitable commercially available circulating pump is centrifugal pump Model 4RJ71, made by Dayton.

Once flow at the required rate and/or pressure is established, for example, 2 to 5 fps flow (feet per second flow) and 1 to 5 psi delivery pressure are likely effective ranges, ore pulp with a P85 of ~180 µm to ~500 µm is added to the open mixer 110 as required to obtain the desired slurry solids density—1% to 5% slurry density is likely effective for particles with hardness not exceeding Mohs 5, 5% to 25% or higher slurry density may be required for particle hardness exceeding Mohs 5 or where previous or empirical milling results have shown statistically significant post milling particle size distribution bi-modality. Recirculation and mixing can continue as required and additional solids, liquids, reagents, solvents or lixiviants can be added as required to the open mixer 110 and will be mixed with the slurry while the apparatus of the present invention is operating in this closed circuit mixing configuration.

The open mixer 110, the pressurized mixer 150, and the piping system could be made of any suitable material, such as standard grade PVC. For example, the open mixer 110 and the pressurized mixer 150 could be made of sch 40 PVC. The pipes are sized to allow for scouring velocity for slurry at a suitable fps, for example, at approximately 2.2 fps. An example of suitable valves used in connection with the apparatus of the present invention is 1 ½" EPDM seat sch 40 PVC ball valve by Spears.

Once mixing is complete, slurry can be partially redirected out of the recirculation circuit into other apparatus piping circuits by opening the pump discharge valve 123. Total redirection to other system piping will occur if the pump discharge valve 123 is opened and either open mixer mixing valve 124 or the open mixer recirculating inlet valve 118 is closed. In this way, the operational configuration of the apparatus of the present invention can be transitioned from mixing recirculation to other process piping in a controlled or throttled fashion, moving from partial to total external diversion at the rate desired. Slurry mixture can be drained out of the system or redirected to an externally connected process or device by opening the chamber drain 116 and allowing flow out P005. Slurry mixture can be recirculated back into the open mixer 110 and held by closing either the open mixer drain valve 113 or the chamber inlet valve 114. The circulating pump 120 will continue to operate until the suction flooding chamber 115 is empty or the NPSHr (net positive suction head required) of the circulating pump 120 is no longer available.

Recirculating flow rates and the discharge pressure of the circulating pump 120 can be set by controller 900 as required to accommodate the characteristics of a particular mixture and the piping system ratings and sizes with a minimum flow rate no less then 2 fps in the largest diameter pipe for effective initial mixing. The controller 900 also monitors one or more parameters during the slurry mixing process.

Use of the Apparatus of the Present Invention During Bubble Collapse Milling With Low Pressure Circulation—Still referring to FIGS. 1A-1B, specific reference is made to the following components of the subsystem: open mixer 110, suction flooding chamber 115, circulating pump 120, bubble collapse mill 130 and controller 900.

Proceeding from the open mixer 110 following the direction of flow, the slurry mixture or other supply liquid flows from the open mixer 110. If the apparatus is physically configured for slurry mixing and open mixer 110 recirculation, as described hereinbefore, the apparatus configuration is transitioned from slurry mixing to low pressure milling recirculation by closing the following valves: the pressurized mixer inlet valve 152, pressurized mixer drain valve 153, pressurized mixer transfer valve 155, chamber drain valve 116, and mill drain valve 134. Next, the following valves are opened: open mixer inlet valve 112, open mixer drain valve 113, chamber inlet valve 114, pump suction valve 122, mill inlet valve 132, and mill outlet valve 133. The desired initial mill effluent delivery pressure or flow is set using regulator pressurized mixer PRV (pressure regulating valve) 154. The open mixer mixing valve 124 is closed while the pump discharge valve 123 is opened to provide a smooth transition from slurry mixing to process recirculation. The recirculating inlet valve 118 is closed to isolate the open mixer 110. The speed of the circulating pump 120 is set to provide the required inlet pressure of the bubble collapse mill 130. Finally, the pressurized mixer PRV regulator 154 and the speed of the circulating pump 120 can be adjusted to provide the required mill pressure and flow or mill effluent step down pressure.

Slurry will now flow from the open mixer 110 through the inlet pipes P001, P002, and P003 to the suction flooding chamber 115, then through inlet pipes P004, P006 and P007 to the inlet of the circulating pump 120. Once the circulating pump 120 is started, recirculation flow begins through discharge pipes P008 and P009. As the flow is redirected to the mill through pump discharge 123 and open mixer mixing valve 124 operation, flow switches from P009 to P012 and continues through P015, through the bubble collapse mill 130, then through P016 and P017 to the pressurized mixer PRV 154, where flow and downstream pressure are regulated. Flow continues at the regulated step down pressure through P018, P048 and P049 back to the open mixer 110.

Once system operational parameters are stable, the bubble collapse mill 130 can be activated. Processing can continue in this mode continuously or as required. When processing is complete, slurry mixture can be drained out of the system or redirected to an externally connected process or device by opening the chamber drain valve 116 through P005 or the mill drain valve 134 through P052, or both. Slurry mixture can be recirculated back into the open mixer 110 and held by closing either the open mixer drain valve 113 or the chamber inlet valve 114; the circulating pump 120 will continue to operate until the suction flooding chamber 115 is empty or the NPSHr of the circulating pump 120 is no longer available. The inlet pressure of the bubble collapse mill 130, and downstream pressure and flow, as controlled by the pressurized mixer PRV regulator 154 and the circulating pump 120 speed can be changed manually at intervals as required or automatically by controlling apparatus in response to measured process variables or other parameter values as determined by the control system 900 and its algorithms or logic of the present invention. In this way, performance of a particular bubble collapse mill 130 when used in conjunction with the apparatus of the present invention can be optimized both initially and continuously during the milling process. Cavitation or bubble mill devices are commercially available. An example of a suitable commercially available cavitation or bubble mill device is an ultrasound device identified as UIP 1000 HD manufactured by Hielscher Ultrasonics, based in Germany. A bubble mill may be controlled by a controller which is sold with the cavitation or bubble mill. In order to obtain feedback and to provide for control of the cavitation or bubble mill, a current transformer can be used to measure power. The pressure differential can be measured on the downstream side of the mill, or in the mill. Power consumption can be modulated by manipulating temperature, pressure, flow, and ultrasonic horn amplitude.

In the mill, solid particulates in aqueous solution suspension nucleate and cause bubble formation. Supersonic jets of water are directed to the particle surface, causing the particle to fracture, erode or degrade, reducing the size of the particle, exposing or freeing encapsulated gold or silver particles within the containing aqueous solution suspended ore particle. Accordingly, a particulate material is milled using the particulate material itself as the milling media. Conventional stirred media and other milling apparatus use inert or other media to apply pressure to the milled ore particles to erode or fracture these particles. Where the ore particles are harder than the milling media, the milling media is consumed or degraded at an unacceptable rate. Cavitational bubble collapse on the surface of an ore particle causing the particle to move rapidly in the media away from the site of bubble collapse—as a result of the high speed liquid jet emitted from the asymmetrically collapsing bubble—striking adjacent ore particles, resulting in erosion and fracture of both the moving and struck particle. In this way, particles of ore strike each other during milling, enhancing milling performance and eliminating the problem of media consumption as a function of ore particle hardness. As such, milling media wear and consumption can be eliminated. The physical and chemical effects of aqueous solution bubble collapse are used as the mechanism of action to provide ore particle size degradation, oxidation and chemical degradation of ore matrix compounds and other physical and chemical effects. As the bubbles used in the aforementioned mechanisms are created and collapsed continuously, and as the bubbles providing the mechanism of action are renewable and produce the milling action, no other renewable, replaceable or consumable milling media apart from the aqueous solution is required for the apparatus of the present invention to perform the functions described herein.

The pump discharge valve 123, the open mixer mixing valve 124, and the regulator pressurized mixer PRV 154 could be flow control valves (FCV) and/or pressure control valves (PCV) that could be used to regulate either pressure or flow. An example of a suitable commercially available valve is Cla-Val Hytrol or Cla-Val PRV Model 90-01, manufactured by Cla-Val, based in Newport Beach, Calif.

Use of the Apparatus of the Present Invention During Bubble Collapse Milling With Regulated Pressure Circulation—Referring still to FIGS. 1A-1B, specific reference is made to the following components of the subsystem: pressurized mixer 150, open mixer 110, suction flooding chamber 115, circulating pump 120, bubble collapse mill 130, coolant pump 140, cooler 145, and controller 900.

If the apparatus is physically configured for slurry mixing or low pressure milling and open mixer 110 recirculation or as described hereinbefore, and that recirculating flow as described hereinbefore for slurry mixing or low pressure milling has been established and is stable, the apparatus configuration can be transitioned from slurry mixing or low pressure milling recirculation to high or regulated pressure milling recirculation. First, the following valves are closed: the chamber flush valve 163, the open mixer supply valve 164, the pressurized mixer supply valve 165, the pressurized mixer gas sample valve 157, the pressurized mixer inlet valve 152, the pressurized mixer drain valve 153, the pressurized mixer transfer valve 155, the chamber drain valve 116, and the mill drain valve 134. An example of a suitable commercially available PM vacuum/compressor is a Gast model DOA P707 AA.

To transition from slurry mixing to regulated pressure milling recirculation, the pump discharge valve 123 is opened, then the open mixer mixing valve 124 is closed, then the pressurized mixer inlet valve 152 is opened. Flow will now divert into the pressurized mixer 150 and will continue until the open mixer 110 and the suction flooding chamber 115 are empty or the NPSHr of the circulating pump 120 is no longer available.

To transition from low pressure milling recirculation to regulated pressure milling recirculation, the open mixer inlet valve 112 and open mixer mixing valve 124 are fully closed, and then the pressurized mixer inlet valve 152 is opened. Flow will now divert into the pressurized mixer 150 and will continue until the open mixer 110 and the suction flooding chamber 115 are empty or the NPSHr of the circulating pump 120 is no longer available.

As the isolated pressurized mixer 150 is filled, it will evolve an internal pressure as a function of headspace gas compression and inlet delivered pressure. Consequently, flow will continue into the pressurized mixer 150 until its internal pressure equals the delivery pressure of the pressurized mixer PRV 154 or discharge pressure of the circulating pump 120.

Once transfilling into the pressurized mixer 150 is complete, the open mixer drain valve 113 is closed, the pressurized mixer drain valve 153 is opened and the speed of the circulating pump 120 and the regulatory delivery pressure of the pressurized mixer PRV 154 regulator is started, restarted or reset to provide the required mill pressure and flow or mill effluent step down pressure.

Additional pressure can be applied to the pressurized mixer 150 by use of pressurized gas charging or sparging (not shown) or by adding additional water or solution through operation of the pressure mixer supply valve 165. Either of these alternate pressurization or charging methods could be automated, through the use of a PRV valve (not shown) on the supply line, or a motorized supply (not shown) or blow down (not shown) valve operated by the controller 900 using control system residing valve sequencing and operation logic programmed therein.

Slurry will now flow from the pressurized mixer 150 through the inlet pipes P022, P023, P002, and P003 to the suction flooding chamber 115, then through inlet pipes P004, P006, and P007 to the inlet of the circulating pump 120 and out through discharge pipes P008, P012, P015 and into the bubble collapse mill 130. Flow continues out through pipes P016 and P017 to the pressurized mixer PRV 154, where flow and downstream pressure can be regulated. Flow continues at the regulated step down pressure through P018, P050 and P020 back to the pressurized mixer 150.

Once system operational parameters are stable, the bubble collapse mill 130 can be activated, reactivated, or adjusted. Processing can continue in this mode continuously or as required. When processing is complete, slurry mixture can be drained out of the system or redirected to an externally connected process or device by opening the chamber drain valve 116 or the mill drain valve 134, or both. Slurry mixture can be recirculated back into the pressurized mixer 150 and held by closing either the pressurized mixer drain valve 153 or the chamber inlet valve 114; the circulating pump 120 will continue to operate until the suction flooding chamber 115 is empty or the NPSHr of the circulating pump 120 is no longer available. The inlet pressure of the bubble collapse mill 130, and downstream pressure and flow, as controlled by the pressurized mixer PRV regulator 154 and the speed of the circulating pump 120 can be changed manually at intervals as required or automatically by controlling apparatus in response to measured process variables or other parameter values, as determined by the control system algorithms or logic of the present invention. In this way, performance of a particular bubble collapse mill 130 when used in conjunction with the apparatus of the present invention can be optimized both initially and continuously during the milling process.

Pressurized bubble collapse milling provides a means to increase the maximum pressure of the circulating pump 120 by raising the NPSH as the internal pressure of the pressurized mixer 150 provides a suction pressure boost. In this way, pressure generated during charging of the pressurized mixer 150 is captured and retained, raising the maximum possible discharge or delivery pressure beyond the maximum output pressure of the circulating pump 120 as required by the bubble collapse mill 130 subsystem connected to the apparatus of the present invention. In addition, mixer pressurization and pressure regulation allows gas solubility and capture control, as well as enabling mechanisms for degassing and sparging (not shown) as may be required to control oxidation and reduction reactions as they are affected by dissolved gas and gas headspace mixture content and concentrations.

Headspace and dissolved gasses can be sampled and tested for content, continuously or at intervals, by opening the pressurized mixer PM gas sample valve 157. When open, headspace and/or dissolved gasses in the contained slurry or solution will flow from the pressurized mixer 150 through P028 and P029 to the pressurized mixer gas detector 158. Sample gas flow will continue as long as the internal pressure of the pressurized mixer 150 exceeds the vent static pressure, or the internal pressure of a vent connected gas receiver (not shown). Alternately, the pressurized mixer gas detector 158 could be an internal and intrinsically safe device installed so as to directly detect headspace gasses of the pressurized mixer 150, or the vent 159 could be connected to a vacuum pump or source (not shown) used to draw dissolved or headspace gasses out of the pressurized mixer 150.

Gasses of interest for detection vary based on the slurry, ore, solution or lixiviant in use and include $O_2$ (molecular oxygen), CO (carbon monoxide), $CO_2$ (carbon dioxide), $H_2S$ (hydrogen sulfide), $CH_4$ (methane) and the LEL (lower explosive limit) percentage during milling to detect and measure ore combustion, roasting, oxidation or other catalyzed chemical reaction products and rates and as a means to evaluate, measure, infer or deduce aspects of ore composition. Gas can be taken off the headspace of the pressurized mixer 150 at a controlled rate using a motorized or manually operated regulating valve (not shown) installed in the piping system of the pressurized mixer gas sample 157, or at intervals, automatically or manually using the pressurized mixer gas sample 157 or an automated sample valve (not shown). The controller 900 incorporates logic to measure and record the detected gas identities and concentrations and use this information to change the controlling parameter identities, operational parameter values and setpoints as required to continue, control and optimize the particle size reduction rate or a desirable chemical reaction's catalysis, such as ore oxidation, as is indicated or measured by the pressurized mixer gas detector 158. An example of a suitable commercially available gas detector is MSA Altair 4, a four gas detector for LEL, CO, $O_2$, $H_2S$.

During pressure regulated bubble collapse milling, significant slurry or solution temperature rise will likely occur, as the temperatures at the center of cavitational bubbles or bubbles mechanically collapsed to plasma hot spots can exceed 5,000° K. (Kelvin). A limited slurry temperature rise may improve performance of the present invention, as chemical oxidation, chemical ore matrix degradation and reaction catalysis, ore matrix compound solubility, and particle size degradation rate may be accelerated at elevated temperatures. Uncontrolled temperature rise, however, especially above 60°

C., will likely adversely affect bubble collapse dynamics and performance of the apparatus of the present invention. The solution or slurry vapor pressure rise due to slurry temperature elevation significantly above 60° C. will likely cause an increase in the internal static pressure of the cavitationally or mechanically formed bubble, damping the rate of collapse and the ultimate forces and temperatures realized at bubble collapse, diminishing the particle size degradation and chemical reaction rates of the connected bubble collapse mill 130 subsystem.

To control temperature rise and the consequent degradation in bubble collapse milling performance and chemical catalysis, or to maintain a known optimal operating temperature for use in a particular configuration, or with a specific set of subsystems or a particular ore, the apparatus of the present invention includes an externally controlled cooling subsystem for operation in conjunction with a compatible bubble collapse mill 130 subsystem, which should provide an inlet, connected to pipe P044, and an outlet, connected to pipe P038, for externally admitted coolant. Before starting the mill cooling subsystem, the coolant drain valve 144 is closed, the coolant inlet valve 142 and the coolant outlet valve 143 are opened and then the system is filled with coolant (coolant inlet not shown). The coolant pump 140 is started and the coolant flows from the cooler 145 through pump inlet pipe P042 and out through pump discharge pipes P043 and P044 into the bubble collapse mill 130 subsystem's internal cooling apparatus and out through pipe P038, P039, P041 and back to the cooler 145. To drain the cooling system, the coolant pump 140 is stopped and the coolant drain 144 is opened. The coolant then flows through pipes P039 and P040 out of the cooling subsystem piping and components. Operation of the cooling system can be continuous, or intermittent, controlled manually or by the controller 900 of the present invention. The controller 900 of the present invention contains components, setpoints and logic to operate the coolant pump 140 at a variable rate as required and as directed by the controller 900 using process slurry temperature detection and measurement. In this way, an optimal internal operating temperature of the bubble collapse mill 130 can be maintained or an excessively high temperature can be ameliorated. An example of a suitable commercially available cooling system is Polyscience Model 6000 from Chiller. In this model, the controller SC-930 is internal to the controller. However, the controller SC-930 could be external.

Apparatus of the Present Invention Use During Batch Bubble Collapse Milling—Still referring to FIGS. 1A-1B, specific reference is made to the following components of the subsystem: pressurized mixer 150, open mixer 110, suction flushing chamber 115, circulating pump 120, bubble collapse mill 130, and controller 900.

If the apparatus is physically configured for slurry mixing as described hereinbefore, and that recirculating flow as described previously for slurry mixing has been established and is stable, the apparatus configuration is transitioned from slurry mixing to batch milling by closing the following valves: the open mixer inlet valve 112, pressurized mixer valve 152, the pressurized mixer drain valve 153, the pressurized mixer transfer valve 155, the pressurized mixer supply valve 165, the chamber flush valve 163, the open mixer supply valve 164, the pressurized mixer gas sample valve 157, the chamber drain valve 116, and the mill drain valve 134.

Next, the following valves are opened: the open mixer drain valve 113, chamber inlet valve 114, pump suction valve 122, mill inlet valve 132, and mill outlet valve 133. The desired initial mill effluent delivery pressure or flow is set using regulator pressurized mixer PRV 154. The open mixer mixing valve 124 is closed while the pump discharge valve 123 is opened. This will provide a smooth transition from slurry mixing to the milling circuit. The recirculating inlet valve 118 is closed to isolate the open mixer 110 and the pressurized mixer inlet valve 152 is opened. This creates a process circuit pathway from the open mixer 110, through the bubble collapse mill 130, terminating at the pressurized mixer 150. The circulating pump 120 speed is set to provide the required inlet pressure of the bubble collapse mill 130. Finally, the pressurized mixer PRV regulator 154 and the speed of the circulating pump 120 is adjusted to provide the required mill flow or mill effluent step down pressure. Pressurized mixer relief valve 156 is connected to pressurized mixer 150.

Slurry will now flow from the open mixer 110 through the inlet pipes P001, P002, and P003 to the suction flooding chamber 115, then through inlet pipes P004, P006 and P007 to the inlet of the circulating pump 120. Once the circulating pump 120 is started, slurry initially flows through discharge pipes P008 and P009. As the flow is redirected to the mill through pump discharge 123 and open mixer mixing valve 124 operation, flow switches from P009 to P012 and continues through P015, through the bubble collapse mill 130, then through P016 and P017 to the pressurized mixer PRV 154, where flow and downstream pressure can be regulated. Flow continues at the regulated step down pressure through P018, P050 and P020 into the pressurized mixer 150.

The bubble collapse mill 130 is preferably activated simultaneously with operation of the circulating pump 120 in batch mode when transfilling from the open mixer 110 into the pressurized mixer 150. As the isolated pressurized mixer 150 is filled, it will evolve an internal pressure as a function of headspace gas compression and inlet delivered pressure. Consequently, flow will continue into the pressurized mixer 150 until its internal pressure equals the delivery pressure of the pressurized mixer PRV 154 or the discharge pressure of the circulating pump 120. To insure complete transfilling, the speed of the circulating pump 120 and pressurized mixer PRV 154 can be adjusted, either initially, at intervals, or continuously during transfilling so that the delivered mill effluent step down pressure is greater than the static pressure in the pressurized mixer 150. Alternately, the static pressure of the pressurized mixer 150 can be relieved to permit continued transfilling when the maximum step down pressure of the pressurized mixer PRV 154 is exceeded, intermittently or continuously, by operating the pressurized mixer gas sample valve 157 as a pressure relief valve, or by use of a automatic or motorized pressure regulating valve (not shown) either preset or as directed by the controller 900 and its logic.

When a batch has been completely transfilled, if processing is complete, slurry mixture can be drained out of the system or redirected to an externally connected process or device by first closing the open mixer drain valve 113, then opening pressurized mixer drain valve 153 and finally opening the chamber drain valve 116 or the mill drain valve 134, or both. To rerun a batch, the pressurized mixer transfer valve 155 is opened to drain the batch out of the pressurized mixer 150 into the open mixer 110 through pipes P024 and P025, the pressurized mixer transfer valve 155 is closed and the batch is run again using the open mixer 110 as the slurry source as hereinbefore described.

Alternately, the batch can be transfilled using the circulating pump 120 from the pressurized mixer 150 back into the open mixer 110 either before or while reprocessing the batch. To transfill from the pressurized mixer 150 back into the open mixer 110, first the open mixer drain valve 113 and pressurized mixer inlet valve 152 are closed, then the pressurized mixer drain valve 153 and open mixer inlet valve 112 are opened. When the circulating pump 120 is started, flow will proceed from the pressurized mixer 150 through pipes P022, P023, P002 and P003 to the suction flooding chamber 115, through pipes P004, P006 and P007 to the circulating pump 120, out of the circulating pump 120 through pipes P008, P012 and P015, through the bubble collapse mill 130, out of the bubble collapse mill 130 through pipes P016 and P017 through the pressurized mixer PRV 154, then through pipes P018, P048 and P049 into the open mixer 110.

During batch run transfilling, regardless of source and target mixers or slurry flow direction, the inlet pressure of the bubble collapse mill 130, downstream pressure and flow, as controlled by the pressurized mixer PRV regulator 154, and the speed of the circulating pump 120 can be changed manually at intervals as required or automatically by the controller 900 in response to measured process variables or other parameter values as determined by the control system algorithms and/or logic of the present invention. In this way, performance of a particular bubble collapse mill 130 when used in conjunction with the apparatus of the present invention can be optimized both initially and continuously during the batch milling process.

Gas testing of the pressurized mixer 150 and cooling subsystem implementation during batch processing are carried out using the same components and methods of the present invention as described hereinbefore in the detailed description of apparatus use during bubble collapse milling with regulated pressure circulation.

The Control System and Components of the Integration Subsystem—still referring to FIGS. 1A-1B, the controller 900 provides subsystem and component operation condition detection and control functions and services. The intrinsic components of the controller 900, the installed auxiliary device control and state detection sensors and the signal processing devices used to interconnect the sensors of the present invention and controller components together comprise the extensible, componentized integration subsystem. The primary control algorithms, operation and detection sequencing instructions and setpoints or setpoint algorithms, are stored in controller PC-901, which can be a PC, Panel-PC, PLC (programmable logic controller) or some other specific purpose programmable HMI (human-machine interface) device or controller. An example of a suitable commercially available PLC is Micrologix 1400 Model 1766-L32BWAA from Allen-Bradley. An example of a suitable commercially available PLC software with PID algorithms is RSLogix 500 Professional. An example of a suitable commercially available PC is HP Compaq dx2450.

Each subsystem has a primary or central controller or device that serves to interface and communicate the control and state data signals between the subsystems of the present invention and the controller PC-901. Communication topology and signal types are preferably standardized in the pathway between the various subsystem interface or control devices and the controller PC-901, and can be 4-20 ma, 0-5 vdc, serial Ethernet, Ethernet or some other industry standardized signal and data communication standard. Communications methods between the individual subsystems and their controllers, controlling devices or interfaces of the controller 900 can vary and be as required by the particular subsystem components. Communication between all subsystems and the controller PC-901 could be of the same type, and each subsystem could be a standard interface type. In this way, substitute, replacement, or additional subsystems with variable features or capacities can be incorporated into the apparatus of the present invention without modification to other unaffected subsystem controls or control interfaces, including the controller 900 itself, the controller PC-901 and its algorithms, or the integration subsystem of the present invention.

The controller 900 oversees and marshals interoperation between multiple interconnected subsystems and it has several specific intrinsic functions to direct the subsystems' interdependent operation. The pump control system dynamically calculates optimal pump speed and pump system pressure and flow as required to effectively maintain fixed total power consumption as distributed between a bubble collapse mill and its supporting apparatus, and as required to start and sustain the formation in the pumped media of a specific number of gas and/or vapor bubbles of a particular size and then subsequently collapse the same bubbles at a particular rate to a specific ultimate final bubble size. To accomplish this, the pump system incorporates a controller that provides a speed setpoint signal to the pump motor drive, and pressure and flow setpoint signals used as process variables to calculate the required adjustments to an actual pump speed setpoint.

As a pump motor control system, the controller 900 receives or generates and transmits information/instructions to speed controller SC-910 for the circulating pump 120 (which can be merely a VFD (variable frequency drive)) and to PID (a proportional-integral-derivative controller that could continuously recalculate control variable values required to maintain a predetermined setpoint) PID-911, and to speed controller SC-930 for the coolant pump 140, (speed controller SC-930 is a VFD that receives a speed setpoint signal from the controller 900, setting the speed of the cooling pump 140 to hold a temperature setpoint) and to PID PID-931 motor control start, stop and other variable frequency drive or speed controller function commands and data, including the pump motor speed setpoint signals 991, 993, 994. PID-931 is a controller that could recalculate the setpoint speed of the coolant pump 140 as required to hold the process fluid at a particular setpoint temperature. The PID-931 could receive a temperature setpoint from the controller 900, read the process temperature from TT-932, calculate setpoint error (setpoint temperature—process temperature), then send a continuously recalculated speed signal reducing the setpoint error to SC-930, the cooling subsystem pump speed controller, which is connected to, powers, and controls the rotational speed of the coolant pump 140. An example of a suitable commercially available circulating pump VFD is Model L100-007MFU2 from Hitachi.

The controller 900 controls the bubble collapse milling apparatus, where the primary controlling process variable identity and value can change dynamically, on demand or as required during operation. In this way, operational parameters external and internal to the bubble collapse mill that have significant or desirable impact on the efficacy, particle reduction rate, particle size distribution, chemical degradation capacity, power consumption or other measured variable can be identified, controlled and optimized during and as a consequence of system operation.

In its role as a controller of the bubble collapse mill 130, the controller 900 receives data corresponding to the mill power setpoint 992, and generates or receives and transmits to the mill operational signals and data about pressure, temperature, flow and other parametric data as may be required to operate, control or modify the power setpoint 992, or other parametric control value of a particular installed bubble collapse mill 130 subsystem. As an open or pressurized slurry mixing control system, the controller 900 receives signals from the pressurized mixer gas detector 158 and system pressure, flow and temperature transmitters, PT-912, FT-952 and TT-932, and uses these values to calculate the corrections of the system setpoints 991, 992, 993, and 994 as required to establish or sustain operation of the present invention in a particular system configuration. PT-912 is a sensor and transmitter for pressure, FT-952 is a sensor and transmitter for flow, and TT-932 is a sensor and transmitter for temperature. Pressure/flow/temperature correlate to element/transmitter/indicator, such that PE would be a pressure element, TT a temperature transmitter. The sensors comprise a detector element to measure and a transmitter to send the value. While the sensors are shown as discrete devices, the sensors could be a single device. Values sent from transmitters are shown to users on indicators, which can be local or remote gauges or computer graphical monitors. An example of a suitable commercially available pressure sensor/transmitter is Ashcroft Xmitr, 0-100 psi, 3".

Finally, the controller 900 serves as a supervisory control and data acquisition system, gathering the aforementioned subsystem operational and state data for the purpose of adjusting and optimizing the parametric operational control of the apparatus of the present invention.

The circulating pump 120 is powered by SC-910, and together with PID-911, the speed of the circulating pump 120 is regulated to provide and maintain either a specific discharge pressure or flow rate or both. When operating in flow control mode, a target flow rate setpoint is received or calculated by PC-901 and transmitted along with other VFD and PID parametric data to SC-910 and PID-911. The flowmeter FE-953, a Doppler, transit time, hybrid or other type of flowmeter, measures the flow rate and that signal is converted and transmitted by FT-952 to SC-910 and PID-911 to be used as the process variable for control of flow setpoint 994 (setpoint 994 controls pump speed and is used as the control variable for pump speed, flow or pressure control of circulating pump 120) and for correction calculations used to recalculate the rotational speed frequency of the circulating pump 120 generated by SC-910. Alternately, or in addition to the aforementioned flow control method, pressurized mixer PRV 154 could be fitted with a motorized or otherwise automatically controlled pilot regulator (not shown) permitting remote adjustment of flow by adjusting the downstream delivery pressure as controlled by pressurized mixer PRV 154. An example of a suitable commercially available flowmeter is Cole-Palmer Hybrid Ultrasonic Flowmeter.

In pressure control mode, a target discharge pressure setpoint 994 is received or calculated by PC-901 and transmitted along with other VFD and PID parametric data to SC-910 and PID-911. The pressure sensor PE-913, a pressure transducer, measures the discharge pressure of the circulating pump 120 and that signal is converted and transmitted by PT-912 to PID-911 to be used as the process variable for correction calculations of the discharge pressure setpoint 991 used to recalculate the rotational speed frequency of the circulating pump 120 generated by SC-910. PT-912 is a sensor and a pressure transmitter that sends the pressure reading detected by pressure element 913, which is connected to and senses the inlet pressure of the bubble mill 130.

Simultaneous pressure and flow control of the circulating pump 120 can be implemented by PC-901 through dynamic process variable selection. Flow or pressure can be selected as the independent process variable, such that a pressure or flow setpoint 991, 994 is fixed initially and independently, then the other variable can be controlled across a spectrum of values while the primary controlled process variable is maintained within a specified limited range. In this way, the apparatus of the present invention can be operated across a large range of possible pressures or flows while holding the controlling process variable at a specific value or across a limited range of values.

The coolant pump 140 is powered by SC-930, and together with PID-931, the speed of the coolant pump 140 is regulated to provide and maintain, as required by a compatible bubble collapse mill 130, either a specific operational temperature or temperature reduction and control above a temperature ceiling. In either mode, a target internal temperature setpoint 993 of the bubble collapse mill 130 is received or calculated by PC-901 and transmitted along with other VFD and PID parametric data to SC-930 and PID-931. The temperature sensor TE-933, such as a temperature transducer, measures the mill temperature, either directly or as relayed internally from the bubble collapse mill 130, and that signal is converted and transmitted by TT-932 to SC-930 and PID-931 to be used as the process variable for correction calculations of the temperature setpoint 993 used to recalculate the rotational speed frequency of the coolant pump 140 generated by SC-910 in both modes or, operating in temperature reduction mode, when to start and stop the coolant pump 140.

Simultaneous pressure and flow control of the circulating pump 120 in conjunction with temperature control of the coolant pump 140 can be implemented by PC-901 through dynamic process variable selection. Flow, pressure or temperature can be selected as the independent process variable, such that an initial pressure, temperature or flow setpoint 991, 993 and 994 is fixed independently, then the other process variables can be controlled across a spectrum of values while the primary controlled process variable is maintained within a specified limited range. In this way, the apparatus of the present invention can be operated across a large range of possible temperatures, pressures or flows while holding the controlling process variable at a specific value or within a limited range of values.

The bubble collapse mill 130 can interact with the controller 900 as either a supervisory or a supervised subsystem. When operating as a supervisory subsystem, the bubble collapse mill 130 receives setpoint mill performance parameter values or process variables, such as the setpoint mill power 992, from the controller PC-901 and then the bubble collapse mill 130 calculates or determines and delivers pressure, flow and temperature setpoints or other subsystem process variable values to the controller PC-901, which then relays or redirects and regulates the control signals and setpoints so that the invention subsystems perform according to the direction of the bubble collapse mill 130. When the bubble collapse mill 130 is a supervised subsystem, all parameter values and setpoints, including the setpoint mill power 992 and other mill controlling process variables, originate with or are relayed from the controller PC-901 or the invention subsystems themselves.

When the bubble collapse mill 130 subsystem has no internal integrated control system or internal advanced process control, the apparatus of the present invention and controller 900 can supervise and monitor the installed mill. In this supervised mode, the controller 900 delivers a setpoint 992 of the mill power or other setpoints to the mill controller CC-920, initiating and setting the operational state of the bubble collapse mill 130 for desired operation. The bubble collapse mill 130 is powered by CC-920, and together with PID-925, its power is regulated to provide and maintain the setpoint 992 of the mill power or other setpoints that may have been transmitted. PID-925 is a proportional-integral-derivative controller that could calculate the setpoint power of the bubble mill controller. When using ultrasonic cavitation, PID-925 reads cavitational generator power usage from a current transformer, then recalculates temperature, pressure, flow and ultrasonic amplitude setpoints, sending the new amplitude setpoint to CC-920, and the other parameter setpoints back up the command chain to the master controller 900. The power meter OE-927, a current transformer, power meter or other monitoring device as required to sense and report a specific process variable corresponding to a power setpoint 992 of the bubble collapse mill 130 or other operational setpoints, measures the power or other process variable and that signal is converted and transmitted by OT-926 to CC-920 and PID-925 to be used as the process variable for control of power setpoint 992 and for correction calculations used to recalculate the power output of the bubble collapse mill 130 or other operational characteristic as controlled by CC-920.

Simultaneous power control of the bubble collapse mill 130, pressure and flow control of the circulating pump 120 and temperature control of the coolant pump 140 can be implemented by PC-901 through dynamic process variable selection, and in this particular instance of simultaneous control, the objective is maximizing or optimizing the performance or power output of the mill subsystem. Flow, pressure or temperature can be selected as the independent process variable, such that an initial pressure, temperature or flow setpoint 991, 993 and 994 is fixed independently. The selected independent variables value is then tracked and correlated with the power of the bubble collapse mill 130, an evaluation is made using controller logic 981 and milling logic 982 to determine the degree of fit between the selected independent process variable and the power, while other dependent process variables are permitted to vary across a specific range, and a final mill power or performance correlation value is assigned to the current independent process variable.

This process is repeated for each of the process variables, including temperature, pressure, flow, mill variables tracked besides power, or other subsystem variables, providing a correlation matrix describing how each process variable relates to mill power and performance. The controller logic 981 and milling logic 982 use these matrix values to dynamically select those process variables identities and values whose control and value ranges provide the most accurate regulation of mill power and performance. This method provides a means to adjust to changing process variable correlations or performance bands—where two or more discontinuous process variable values or value ranges produce desired or correlated mill power or performance but interstitial process variable value ranges do not—or where these predictable performance bands or value ranges are changing over time. This control strategy permits the controller PC-901 to evaluate and vary independent and dependent process variable identities and setpoint values dynamically over time so that mill power or performance is maintained or maximized as the condition of the milled media, its composition, density, particle size distribution, gas content and composition, temperature, and other physical and chemical properties change as a consequence of the action of the apparatus of the present invention.

When the bubble collapse mill 130 subsystem is fitted with an intrinsic advanced process controller, the apparatus of the present invention and controller PC-901 receive independent and dependent process variable identities and values or ranges from and relay sensor data to that advanced process controller. When the bubble collapse mill 130 serves as the supervisor mode, the controller PC-901 delivers a setpoint 992 of the mill power or other setpoints to the mill controller CC-920, initiating and setting the operational state of the bubble collapse mill 130 for desired operation. The bubble collapse mill 130 is powered and regulated by CC-920, and together with PID-925, it determines the independent and dependent process variable identities and values, transmitting these to controller PC-901, which in turn relays the CC-920 calculated setpoints to the corresponding subsystems, subsequent setpoint regulation of the respective subsystems conducted without further external direction by controller PC-901. CC-920 and PID-925 receive through power signal transmitter OT-926 a mill power signal from 0E-927, a current transformer, power meter or other monitoring device that is used to for correction calculations of the power setpoint 992 and to recalculate the process variable identities and values delivered to and regulated by controller PC-901, maintaining or optimizing mill performance and power continuously and dynamically over time. OT-926 and 0E-927 describe a device that measures the current used by a device and transmits that current value as a proportional control signal to a PID or PLC input. An example of a suitable commercially available current transformer is AcuAmp ACTR050-42L-F from Automation Direct (www.automationdirect.com). An example of a suitable commercially available ultrasonic generator/transducer/controller is Hielscher UIP 1000hd. An example of a suitable commercially available ultrasonic flowcell where milling takes place is the Hielscher FC2T500K.

This control strategy permits mill controller CC-920 to evaluate and vary independent and dependent process variable identities and setpoint values dynamically over time, directing the controller PC-901 to regulate the subsystems of the present invention in such a way that mill power or performance is maintained or maximized as the condition of the milled media, its composition, density, particle size distribution, gas content and composition, temperature, and other physical and chemical properties change as a consequence of the action of the apparatus of the present invention.

The controller logic 981 stored and executed by the controller PC-901 provides the controller 900 and the operational sequence and other functions. The controller logic 981 can be changed as required to include functions specific to a particular configuration of the present invention. The controller logic 981 could be programmed using any suitable high or low-level computer programming language, and could be embodied as computer-executable instructions stored in a computer-readable medium, such as flash memory or other type of non-volatile memory. FIGS. 1A-1B show an exemplar set of detectors and controlling devices to implement the operational methods explained herein. Other configurations of the apparatus of the present invention are possible using equipment, detectors and controllers not shown, and the apparatus can function without all of the disclosed apparatus subsystems or components.

Accommodating these possible physical configuration changes to the apparatus of the present invention, the controller logic 981 itself—those programming instructions pertaining to the installed apparatus of the present invention and controller 900 device identification, state detection, control and task distribution—can be uploaded to an external computer or device (not shown) for storage, required modification and subsequent download back to controller PC-901. Alternately, separate instances of configuration specific controller logic 981 can be stored locally in the controller 900 or in an external computer or device (not shown), to be uploaded or executed as required by the controller PC-901. Additionally, it may be necessary to change the operational sequence of the apparatus of the present invention for a particular application. Milling logic 982—such as the order of sensor or detector evaluation, the order of setpoint modification, the setpoint values and algorithms for setpoint modification, or algorithms used to identify and recover from operational fault states—is stored in or accessible to and executed on the controller PC-901. As with controller logic 981, a unique version of the milling logic 982 can be stored locally in the controller or on an external device (not shown) or milling logic 982 can be uploaded to an external device or computer (not shown), modified, and downloaded back to the controller PC-901.

Similar to the controller logic 981, the milling logic 982 could be programmed using any suitable high or low-level computer programming language, and could be embodied as computer-executable instructions stored in a computer-readable medium, such as flash memory or other type of non-volatile memory.

Setpoint data (SP) 991, 992, 993 and 994 describing operational parameters such as pump speed, mill power, pressure, flow, temperature and others, that are provided as individual values, independent or dependant values or value ranges or algorithms used to calculate values or value ranges, are stored with or accessible to controller PC-901 and can be uploaded and downloaded to an external device or computer (not shown). In each case, where data or program code stored in or accessible to the controller PC-901 is to be modified, rather then uploading, modifying and downloading existing setpoint data 991, 992, 993 and 994, controller logic 981 or program code of the milling logic 982, it is also possible to access and modify this information on or accessible to the controller 900 directly using an external device or computer (not shown). In addition, an operator control panel (not shown) can be provided to allow manual control of the apparatus of the present invention, manual entry of setpoint data 991, 992, 993 and 994, manual manipulation of or interaction with controller logic 981 or milling logic 982, or manual control of invention subsystems or components directly.

Note that although FIGS. 1A-1B depict a discrete controller PC-901 and other specific purpose controllers, SC-910, CC-920 and SC-930, these functions could be combined in a single special purpose controller, PLC, PC or other similar device. In addition, while controller PC-901 as well as the other controllers (SC-910, CC-920 and SC-930) and PID (PID-911, PID-921 and PID-931) are shown in FIG. 1 to be incorporated into a single controller, devices performing these functions could be installed in separate locations as part of separate controllers—this alternate control component arrangement is likely where the apparatus of the present invention is incorporated into a larger overall process or system. Also, while controller logic 981 and milling logic 982 are depicted in FIGS. 1A-1B as residing in and executing on the controller PC-901, it is possible that the controller logic 981 could reside in and execute on a different controller, PC, PLC, or other similar device than the one that stores and runs milling logic 982, and these separate control, PC, PLC, or alternate devices could also reside in separate controllers. Similar variation in component function distribution, grouping or placement is also possible with the other sensor-transmitter-indicator devices such as SI-915, PI-914, PI-941, FI-951, PI-924, 01-928, SI-915, SI-935, TI-934, PT-912, PE-913, FT-952, FE-953, PT-922, PE-923, OT-926, 0E-927, TT-932 and TE-933. The controller 900 component arrangements and functions rendered in FIGS. 1A-1B are an exemplar of stand-alone, self-contained operation and control of the apparatus of the present invention, for use as depicted when the system is configured and connected upstream and downstream as shown, or as a design feature guide for different physical configurations of the invention or where the invention is incorporated as a single element or step in a multi-function or multi-step process. Consequently, in the discussion of the controller 900 component functions contained herein, it should be understood that where a particular controller, PC, PLC, PID or other device with specific functions is discussed, another type of controller, PC, PLC, PID or other suitable device could be substituted for the one described. Additionally, discrete functions performed by the described component of the controller 900 may be performed by another device along with other unrelated functions.

The apparatus of the present invention can be operated in one or a combination of at least three separate control modes directed by an external device or computer (not shown), or directed by algorithms executed by controller PC-901 using controller logic 981, milling logic 982 and setpoint data 991, 992, 993 and 994, or manually using panel mounted controls (not shown) and indicators. In each of these three modes, the operational parameter values and setpoints, or the algorithms used to calculate them, as well as the useful subsystem process variable identities, are known and are input as controller logic 981, milling logic 982 and setpoint data 991, 992, 993 and 994, or are fixed using manual controls with indicator feedback. These input, set or calculated process parameter values, when used in one of the aforementioned control modes, are known and expected to achieve a particular operational result when using the invention.

The apparatus of the present invention and the design of the controller 900 allow at least one other operational method, where the controller 900 is used as a tool to determine the optimal operational parameter identities and the values of those process variables selected required to produce a particular functional result when utilizing the invention. In this experimental or application development operational mode, the setpoint data 991, 992, 993 and 994 submitted represent test value ranges, or are algorithms used to calculate test value ranges, and include target performance specifications for the apparatus of the present invention and subsystems. In this mode, the milling logic 982 provides both an operational test sequence algorithm that controls how each setpoint should be varied across the submitted range of the setpoint data 991, 992, 993 and 994, as well as an algorithm and criteria to evaluate each set of operational parameter values against the target application performance specifications. During test execution, milling logic 982 stores those operational setpoints that provide useful results, either a good fit or a poor match to the target performance.

Alternately, the operational trials could be directed using an external computer, PLC or other functionally equivalent device (not shown) to submit test setpoint data 991, 992, 993 and 994 and test application logic to controller PC-901, through an external control device interface (not shown). Once testing is complete, result data can be read by or uploaded to an external computer or device (not shown) for storage or further analysis. Rather than storing only criteria matching operational test data, all result data could be stored, locally in the controller 900 or on a remote computer or storage device (not shown) for further analysis. In this way, an invention milling protocol describing the operational conditions and process variable selections most likely to produce a desired result with the apparatus of the present invention can be developed using the apparatus of the present invention and controller 900 itself as a new milling application's test bed.

Figure 2:
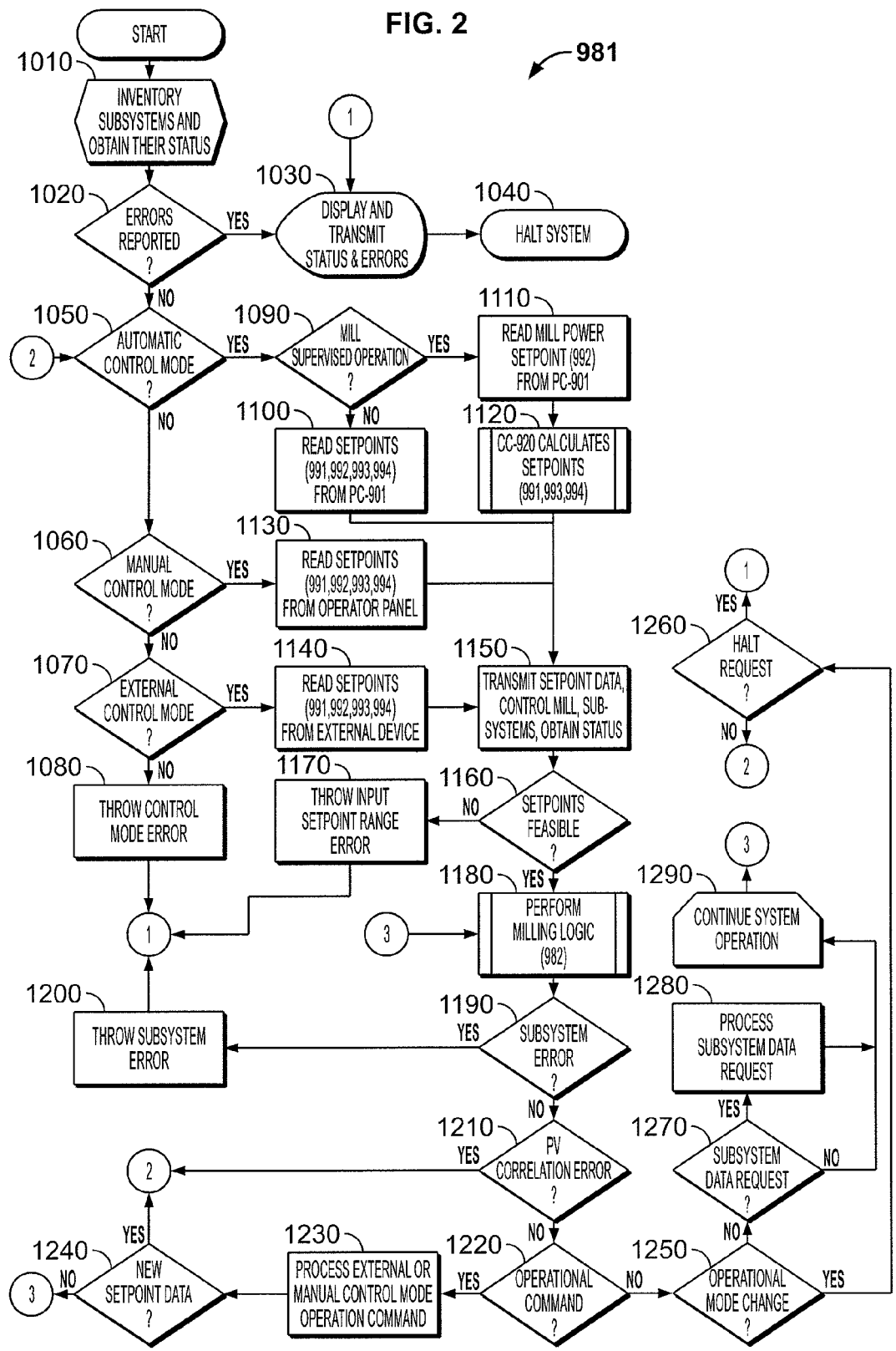
FIG. 2 is a flowchart showing examples of the controller's intrinsic and milling task specific logic, including alternate operational sequences as required by the various functional configurations of the apparatus of the present invention, in accordance with several aspects of the invention.

FIG. 2 is a flowchart showing processing steps that are carried out by the controller logic 981 of the present invention. Beginning in step 1010, the controller logic 981 communicates with the inventory subsystems and obtains the status of the inventory subsystems. A determination is made in step 1020 as to whether any errors are present. If any errors are present, the errors are displayed and the status of the errors is transmitted in step 1030, and then the system is halted in step 1040. Otherwise, a determination is made as whether to initiate automatic control mode in step 1050. If a negative determination is made, another determination is made as to whether to initiate manual control mode in step 1060. If a negative determination is made, yet another determination is made as to whether to initiate external control mode in step 1070. If external control mode is not executed, a control mode error is transmitted ("thrown") in step 1080 and the processing reverts to step 1030.

If automatic control mode is initiated in step 1050, another determination is made as to whether to initiate mill supervised operation in step 1090. If a negative determination is made, the setpoints 991, 992, 993, and 994 are read from PC-901 in step 1100, and step 1120 occurs. Otherwise, in step 1090, mill power setpoint 992 is read from PC-901 in step 1110, and CC-920 calculates the setpoints 991, 993, 994.

If manual control mode is initiated in step 1060, the setpoints 991, 992, 993, and 994 are read from an operator panel in step 1130, and step 1150 occurs. If external control mode is initiated in step 1070, the setpoints 991, 992, 993, and 994 are read from an external device in step 1140, and step 1150 occurs.

In step 1150, the setpoint data is transmitted to the control mill and subsystems. A determination is made as to whether the setpoints are feasible in step 1160. If a negative determination is made, an input setpoint range error is thrown in step 1170, and the processing reverts to step 1030. Otherwise, the milling logic 982 is performed in step 1180.

A determination is made as to whether a subsystem error exists in step 1190. If a positive determination is made, a subsystem error is thrown in step 1200, and the processing reverts to step 1030. Otherwise, in step 1210, a determination is made as to whether a PV (a process variable, such as a measured temperature, pressure, flow, etc.) correlation error exists. If a positive determination is made, the processing reverts to step 1050. Otherwise, a determination is made as to whether to initiate operational command in step 1220. If a positive determination is made, external or manual control mode operation command is executed in step 1230, and a determination is made to initiate new setpoint data in step 1240. If a positive determination is made, the processing reverts to step 1050. Otherwise, the processing reverts to step 1180.

If operational command is not initiated in step 1220, a determination is made as to whether there is a change in operational mode in step 1250. If a positive determination is made in step 1250, a determination is made as to whether to halt the request in step 1260. If a positive determination is made, the processing reverts to step 1030. Otherwise, the processing reverts to step 1050. If operational mode change is not performed in step 1250, a determination is made as to whether to request subsystem data in step 1270. If a positive determination is made, the subsystem data request is processed in step 1280, the operation of the system continues in step 1290, and step 1180 occurs. Otherwise, the operation of the system continues in step 1290, and step 1180 occurs.

Figure 3:
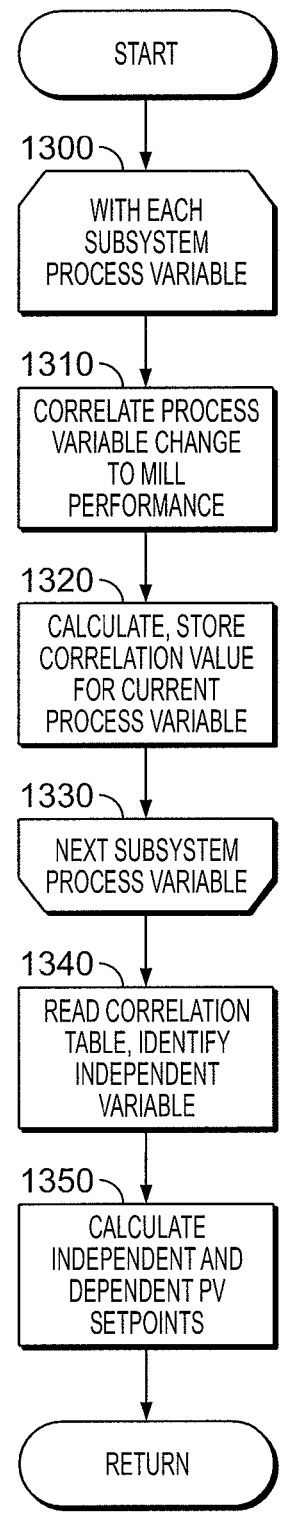
FIG. 3 is a flowchart showing processing steps carried out by a mill controller of the present invention.

FIG. 3 is a flowchart showing processing steps that occur in step 1120 where the setpoints 991, 993, 994 of CC-920 are calculated. Calculation of the setpoints of each subsystem process variable is initiated in step 1300. The process variable change is correlated to mill performance in step 1310, and for the current process variable, the correlation value is calculated and stored in step 1320. The next subsystem process variable is examined in step 1330. The correlation table is read and the independent variable is identified in step 1340. The independent and dependent PV setpoints are calculated in step 1350, and the results are returned.

Figure 4:
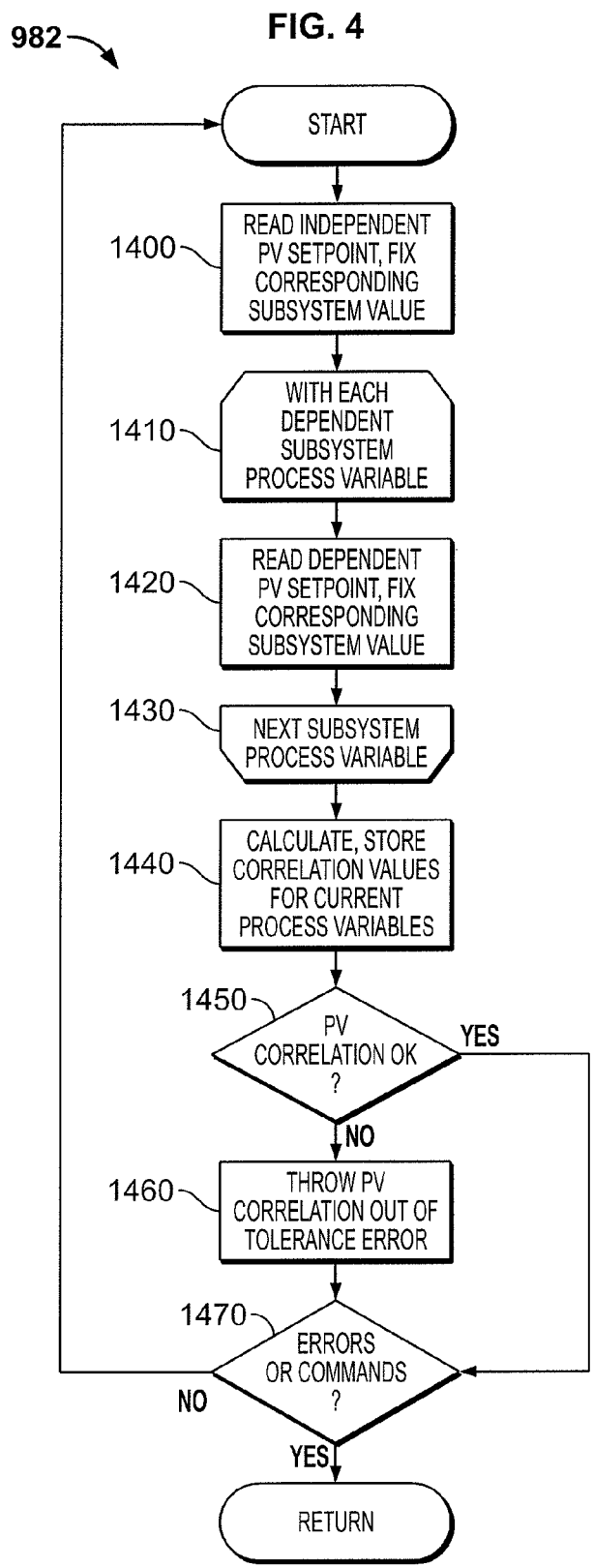
FIG. 4 is a flowchart showing processing steps carried out by a milling task specific logic of the present invention.

FIG. 4 is a flowchart showing processing steps of the milling logic 982. The independent PV setpoint is read, and the corresponding subsystem value is fixed in step 1400. Each dependent subsystem process variable is examined in step 1410, and the dependent PV setpoint is read, and the corresponding subsystem value is fixed in step 1420. The next subsystem process variable is examined in step 1430. The correlation values are calculated and stored in step 1440 for current process variables. In step 1450, a determination is made as to whether the PV correlation is acceptable. If a negative determination, a PV correlation out of tolerance error is thrown in step 1460, and a determination is made as to whether there are any errors or commands in step 1470. Otherwise, the operation reverts directly to step 1470. If step 1470 determines that there are no errors or commands, control returns to step 1400. Otherwise, processing ends.

Figure 5:
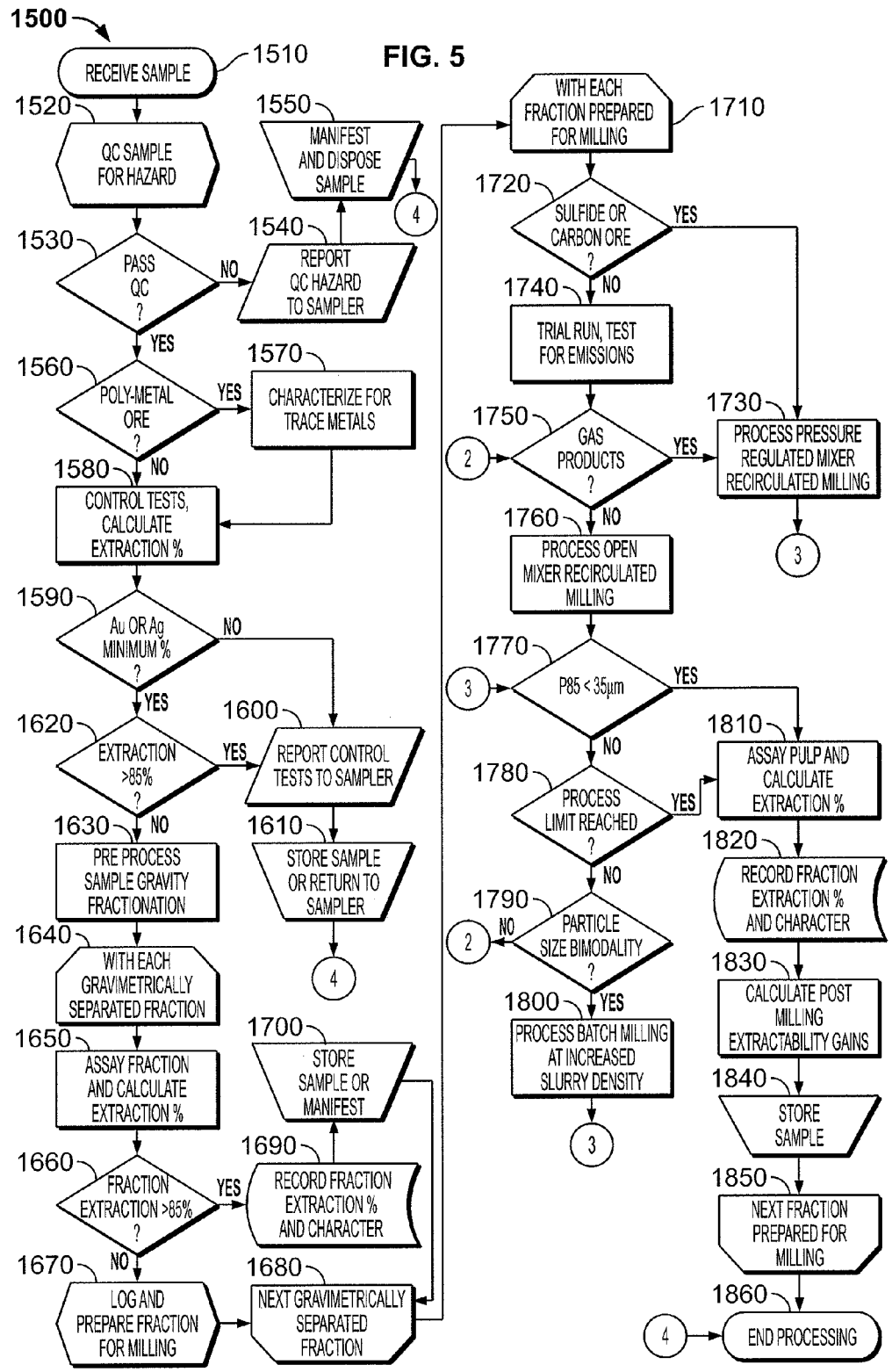
FIG. 5 is a flowchart showing examples of the task-specific logic required to route and process an ore sample, including the process used to determine when a sample should continue through the assay process and what steps to take and configurations to use based on testing results, in accordance with several aspects of the invention.

FIG. 5 is a flowchart showing processing steps, indicated generally at 1500, that show the task specific logic required to route and process an ore sample. Beginning in step 1510, a sample is received. The sample is tested for quality control to identify any hazards in step 1520. A determination is made as to whether the sample has passed quality control in step 1530. If a negative determination is made, the quality control hazard is reported to the sampler in step 1540. Then, the sample is disposed and manifested in step 1550, and processing ends. If the sample has passed quality control in step 1530, a determination is made as to whether the ore is a poly-metal in step 1560. If a positive determination is made, the ore is characterized for trace metals in step 1570, and control tests are conducted and the extraction percentage is calculated in step 1580. Otherwise, the processing reverts directly to step 1580. In step 1590, a determination is made as to whether a minimum percentage of gold or silver is present. If a negative determination is made, the control tests are reported to a sampler in step 1600, the sample is stored or returned to the sampler in step 1610, and processing ends. Otherwise, a determination is made as to whether the extraction percentage is greater than, for example, 85% in step 1620. If a positive determination is made, step 1600 occurs; otherwise, step 1630 occurs.

In step 1630, a pre-process sample gravity fractionation is conducted. With each gravimetrically separated fraction in step 1640, the assay fraction and extraction percentage is calculated in step 1650. Then, a determination is made as to whether the fraction extraction percentage is greater than 85% in step 1660. If a negative determination is made, the fraction for milling is logged and prepared in step 1670 and the next gravimetrically separated fraction is conducted in step 1680. Otherwise, the fraction extraction percentage and character is recorded in step 1690, and the sample is stored or manifested in step 1700, and the processing reverts to step 1680.

Then, with each fraction prepared for milling in step 1710, a determination is made as to whether the ore is sulfide or carbon in step 1720. If a positive determination is made, the pressure regulated mixer recirculated milling is processed in step 1730, and processing is directed to step 1770. Otherwise, a trial run and emissions test is conducted in step 1740. A determination is made as to whether there are any gas products in step 1750. If a positive determination is made, the processing reverts to step 1730. Otherwise, in step 1760, the open mixer recirculated milling is processed.

A determination is made as to whether, for example, the particle size of P85 is more than 35 μm in step 1770. If a negative determination is made, a determination is made as to whether the process limit has been reached in step 1780. If a negative determination is made, a determination is made as to whether there is a particle size bimodality in step 1790. If a negative determination is made, the processing reverts to step 1750. Otherwise, batch milling at increased slurry density is processed in step 1800, and the processing reverts to step 1770.

If the particle size of P85 is less than 35 µm in step 1770, the pulp is assayed and the extraction percentage is calculated in step 1810. If the process limit has been reached in step 1780, processing reverts to step 1810. After step 1810, the fraction, the extraction percentage, and character are recorded in step 1820. The post milling extractability gains are calculated in step 1830, and the sample is stored in step 1840. The next fraction is prepared for milling in step 1850. Processing ends in step 1860.

Figure 6:
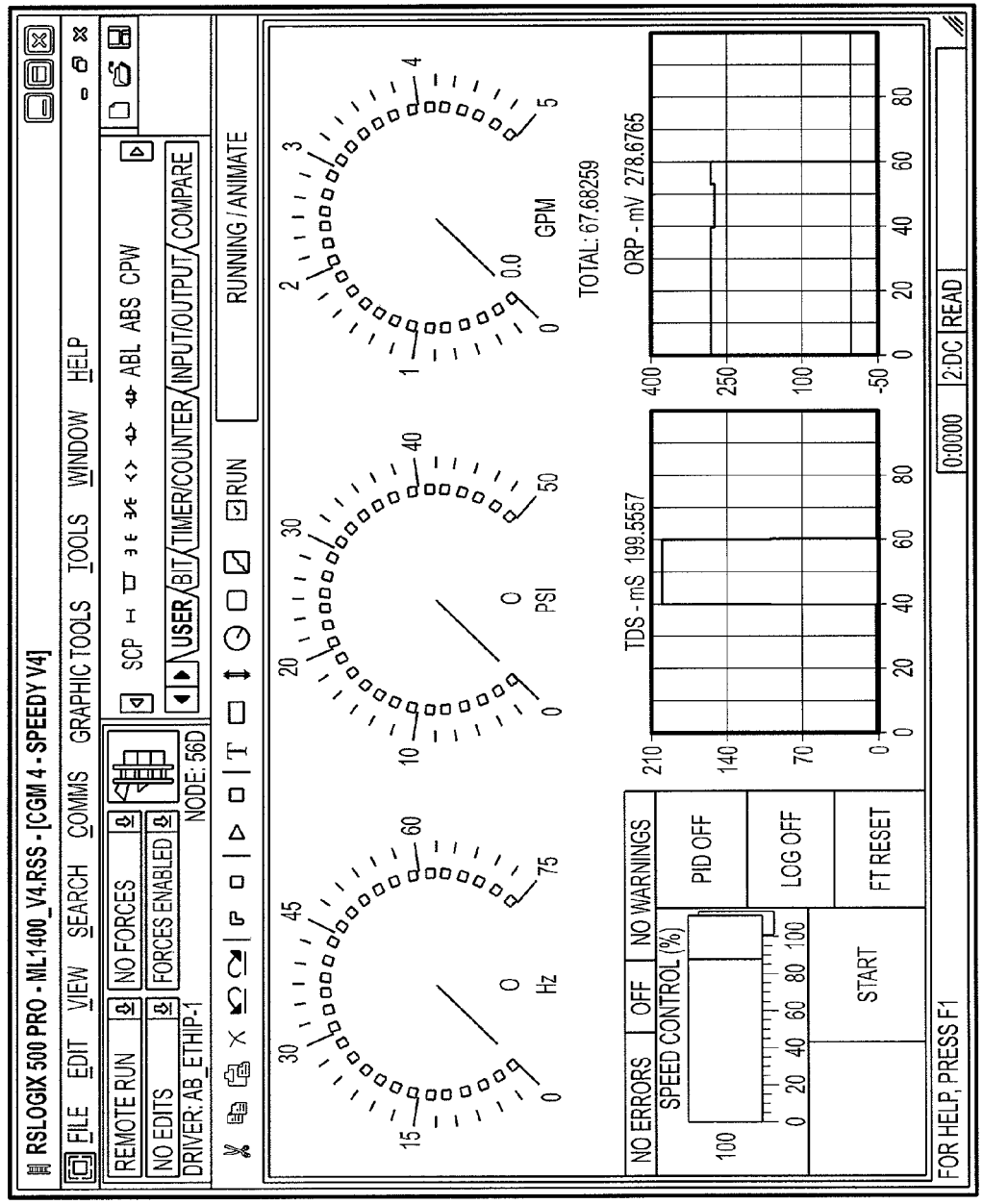
FIG. 6 is a screenshot showing a sample graphical user interface (GUI) display generated by the present invention.

FIG. 6 is a screenshot showing a sample graphical user interface (GUI) display generated by the present invention. The screenshot could be displayed on any desired computing system. The GUI allows an user to access information, to control, and/or to monitor various implementations of the controller 900. The GUI could include information, such as pump speed (Hz), process reactor pressure (psi), flow rate (gpm), total dissolved solids (TDS), and oxidation reduction potential (ORP), etc.

As implemented for ore milling and ore process lixiviant, aqueous solution and process wastewater remediation, real time system control during bubble collapse could be performed by controlling or monitoring one or more of the following: process reactor pressure (psi), dissolved oxygen, total dissolved solids (TDS), and oxidation reduction potential (ORP).

Process reactor pressure (psi) is controlled by direct algorithmic control of pump speed (Hz) and flow rate (gpm), as enabled through parameterized PID control of pressure, flow and bubble collapse amplitude allowing direct control of energy input/gallon.

Dissolved oxygen (DO) is measured in real time and controlled through low pressure (>6 psi) aeration. Increasing dissolved oxygen increases the rate of dissolved solid precipitation, increasing the rate of precious and other metal complexing and precipitate formation.

Total dissolved solids (TDS) are measured and used as part of the power and amplitude input setpoint calculation. During ore milling and oxidation, and precipitate formation during lixiviant remediation, TDS changes indicate the introduction of new solutes, prompting the control program to execute an algorithmic re-evaluation and resetting of current pressure, temperature and flow setpoints as required to maintain methane production, milling rate and sulfide oxidation rates.

Oxidation reduction potential (ORP) is used during real time as a measure of the completion of a bubble collapse process cycle. It has been observed that optimal energy utilization for ore oxidation and precipitate formation occurs when an ORP value of −50 to 350 is observed. Values below 0, especially those below −50, indicate the need for a detention interval, during which time metal hydroxides, oxides and other metal complexes are observed to form as a consequence of the bubble collapse processing interval's changes to aqueous solution pH. Bubble collapse catalyzed water splitting releases hydrogen and hydroxide. Hydroxide reacts and forms metal hydroxide precipitates, such as $Fe(OH)_3$, hydrogen reacts with carbonaceous compounds in suspension and solution to form methane and other alkanes.

This mechanism of control of bubble collapse water splitting using ORP as a PV, a process variable, enhances methane and precipitate production rates, enables neutralization of acidic process and drainage waters without chemical additives, and allows significant reduction in overall process energy consumption, reducing methane production, ore milling, oxidation and lixiviant remediation processing cost.

An example of a suitable commercially available temperature sensor is Hach intrinsic PT100's. An example of a suitable commercially available ORP is Model Drd 1P5 from Hach. An example of a DO sensor is Model 5790000 from Hach. An example of a suitable commercially available TDS sensor is Model D3727E2T from Hach.

The dissolved oxygen controls the precipitation rate. Certain metals which are soft, for example, lead and mercury, initially tend to go into solution and total dissolved solids (TDSs) go way up, which indicates that the first fraction of soft materials have come off. Thereafter, the temperature has to be reduced, and the ultrasonic amplitude has to be increased so that materials like mercury or lead do not vaporize. Dissolved oxygen can be used to control the rate of precipitation by forcing more oxygen into solution which forces other precipitants out of solution. Then by observing total dissolved solids, it can be indicative whether or not a particular new material has either gone into solution or substance has dropped out of solution. When something goes into solution, TDSs go up; if something precipitates, TDSs usually go down.

ORP can be used to measure the internal charge of an aqueous solution used to identify when ionic species in solution have changed. When the ORP drops to a negative value, particularly if it drops precipitously and rapidly to a negative value, the cavitational process is halted and the process slurry or aqueous solution is placed into detention to permit precipitate formation. It is at that point, as a consequence of the production of hydronium and hydroxide from bubble collapse catalyzed water splitting, that the state and chemical reactivity of the aqueous solution has changed. Then the hydroxide and the hydronium react. Accordingly, the aqueous solution undergoes a state change as a consequence of bubble collapse processing and that state change by itself will permit reactions to be catalyzed in detention. Different parameters can be measured while it is in detention to determine when it is ready to start again. ORP is usually the trigger used to measure when to stop and start. The ORP identifies whether a solution has lots of oxidizable material or lots of reducible material, and that is an indication of the state of an aqueous solution. In the case of milling of ores, sulfites are oxidized by driving hydronium and hydroxide into solution. This can be used for mineral sorting. Sequential processing runs can be run at increasingly aggressive conditions to take out increasingly hard minerals.

Figure 7:
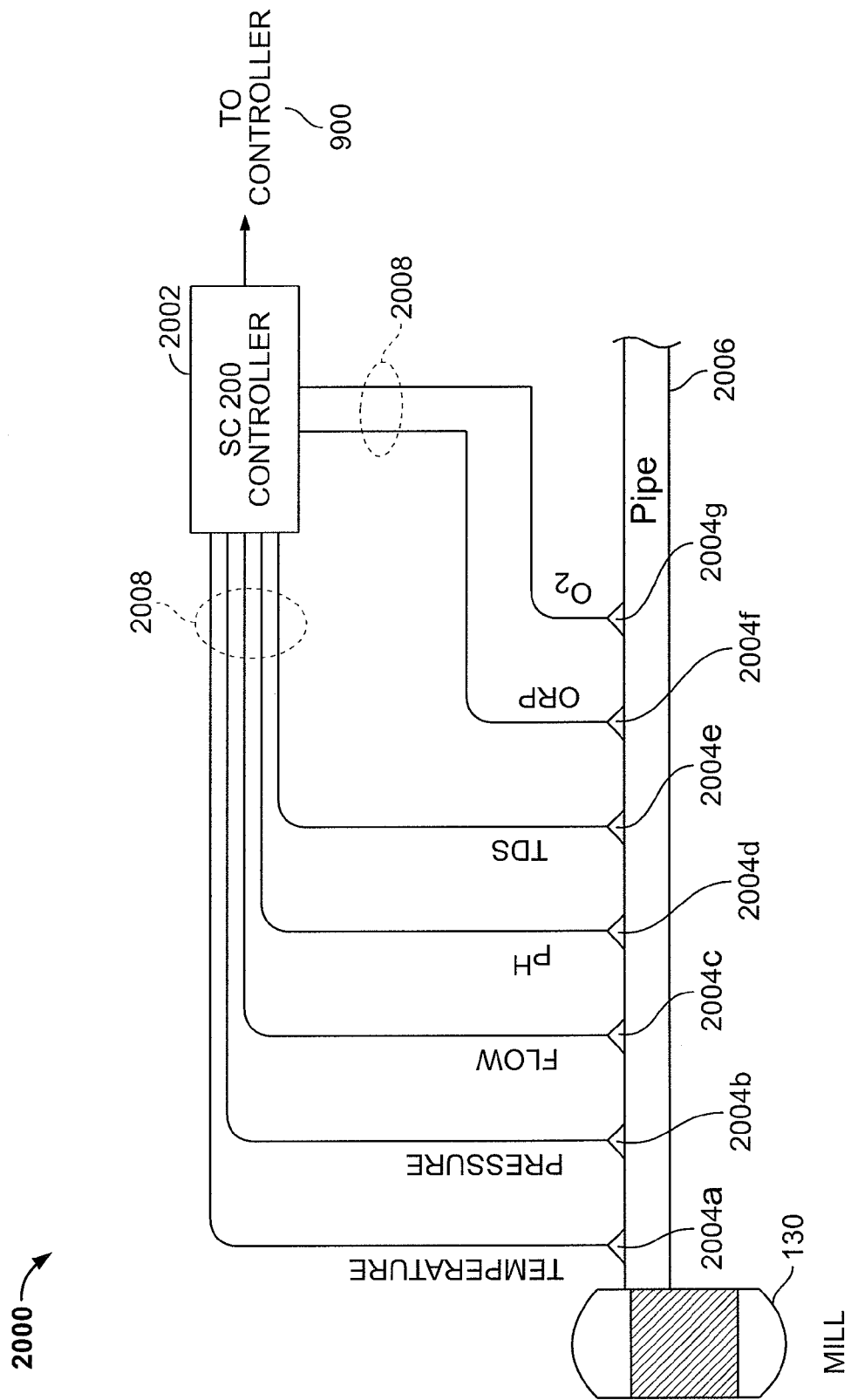
FIG. 7 is a diagram depicting a plurality of sensors and an associated controller for monitoring one or more parameters associated with a bubble collapse mill.

As mentioned herein, and as shown in more detail in FIG. 7, one or more parameters, such as temperature, pressure, flow rate, power, pH, total dissolved solids (TDS), oxidation-reduction potential (ORP), and/or dissolved oxygen ($O_2$) can be monitored in real time and used to control the milling processes of the present invention, using one or more sensors and an associated controller, indicated generally at 2000. A controller 2002 (SC-200), could be provided and connected to one or more sensors 2004a-2004g. The sensors 2004a-2004g could be installed in a pipe 2006 which carries fluid flow downstream of the mill 130. For example, the sensors 2004a-2004g could be installed in and extend through corresponding apertures in the pipe 2006 (in a watertight arrangement), so that the sensors 2004a-2004g are exposed to the fluid in pipe 2006 and can sense one or more desired parameters. The sensors 2004a-2004g could be connected to the controller 2002 using a plurality of cables 2008, and the controller 2002 could be in communication with the controller 900 using any suitable communications link such as Ethernet, serial data (e.g., RS-485 or RS-232), etc. It is noted that any desired number of sensors could be provided to sense any desired number of parameters. An example of a suitable commercially available sensor controller is SC200 from Hach.

During operation of the mill 130, one or more of the sensors 2004a-2004g could sense or more desired parameters, e.g., fluid temperature, pressure, flow rate, power, pH, TDS, ORP, dissolved oxygen, etc. The controller 2002 could digitize the sensed parameters and format same for transmission to the controller 900 for subsequent processing by the controller 900 and adjustment of one or more operating parameters of the mill 130 in real time, to optimize operation of the mill 130. Of course, the controller 2002 could itself be programmed to perform such functions, if desired, so as to directly control the mill 130 and to optimize operation thereof.

The present invention provides for measuring and quantifying an increase or change in the percentage of gold or silver recoverable by lixiviants as used in conventional hydrometallurgic extractions. Comparison of extraction lixiviant performance to smelting performance can be measured by the fire assay method, which is an assay procedure involving fusing in a high temperature furnace. Total gold, silver and precious metal content of a particular ore is determined using the fire assay. Extraction efficiency is determined by measuring the amount of gold or silver recovered by a particular hydrometallurgic or other extraction method and dividing this recoverable metal weight/ton with the weight/ton of the same metal as reported by the fire assay method, yielding an extraction efficiency percentage. This percentage is measured and calculated before and after bubble collapse milling, providing a means to evaluate and compare the change in the amount of extractable silver or gold as a consequence of the action of the apparatus of the present invention. Proportional changes in gold, silver or other precious, semi-precious or otherwise recoverable metal, elemental or compound extraction or separation method efficacies can be quantified and compared. The method of the present invention comprises multiple ore processing steps, which is intended to increase the efficiency of conventional lixiviant based gold, silver and precious metal ore extraction or separation methods, and the method includes a procedure to calculate and compare extraction efficiency increase or change after an ore processing step is implemented.

An Exemplar Test Protocol For Measuring Changes In Extractable Or Separable Gold, Silver and Precious Metals From Ores After Milling And Chemical Degradation Using The Apparatus of the Present Invention—The following is a description of an ore sample testing and trial processing protocol intended to measure changes in the extractable or freed amount of gold or silver after bubble collapse milling of a gold or silver bearing ore. The invention test protocol measures the invention's ore milling and chemical degradation capacity and performance characteristics, evaluating an ore's suitability for processing with a production scale implementation of the apparatus of the present invention.

Ore containing encapsulated micron-sized gold, silver or other precious metal particulates may resist lixiviant extraction, floatation, separation or other recovery methods as the precious metal particles are encapsulated in highly oxidized, refractory, or otherwise extraction or separation process resistant ore matrix compounds. In such cases, the process of the present invention can reduce ore particle sizes beyond the capacity of conventional milling techniques and can simultaneous with milling catalyze chemical reactions and degradation of ore matrix compounds, fracturing, reacting, degrading or otherwise removing the encapsulation and freeing or significantly exposing the gold, silver or other precious metal particulates. Once the particulates are freed or exposed, lixiviant extraction, separation, floatation, leaching, dissolution, gravimetric and other conventional wet or dry extraction or separatory processes previously ineffective when used with a particular ore will increase in efficacy such that these processes can be used to recover increased to cost effective recovery values of the ore gold, silver or other precious metal content.

Control Testing—Prior to initial gravimetric separation and processing by the present invention of a candidate ore sample or ore sample fraction, the percent, by weight, of total gold, silver and precious metal contained within the sample will be determined. In addition, for each ore sample, total gold, silver and precious metal recoverable by acid and cyanide leaching prior to any separation or milling will be measured.

The precious metal extractability testing and measurements utilized by the invention test protocol as described herein for control, post gravitational separation and post milling ore condition analysis provide an indirect indication of the amount of freed or exposed gold. Throughout the protocol, where extractability tests are used to evaluate the condition or state of an ore sample, other tests could be substituted or used additionally, including microscopic inspection and analysis, phase contrast microscopy, scanning electron microscopy, electron probe micro-analysis, interferometric particle imaging or another method or system may be used to visualize or quantify the number and particle size distribution of freed or exposed gold or other precious metal particulates. Alternately, other types of lixiviant extraction, separation, floatation, concentration, milling, roasting or other ore processing mechanisms, methods or apparatus could be used to evaluate the condition of the ore before and after each of the invention test protocol steps—in place of or in addition to the precious metal content and extractability assays described herein—as a means to measure and evaluate the performance of the apparatus of the present invention.

Ore samples used in the invention test protocol should be statistically representative of the ore and it may be desirable to have chain of custody documentation, which could be maintained throughout testing. Each ore sample will be initially assayed as follows:

1. Au and Ag by fire assay and gravimetric finish, measurement of Au up to 1,000 ppm, Ag up to 10,000 ppm. This method will determine total gold, silver and precious metal content of sample.

2. Au by aqua regia (a corrosive solution referred to as nitrohydrochloric acid) extraction with AAS (atomic absorption spectrometry) or ICP-MS (inductively coupled plasma mass spectrometry) finish, measurement of recoverable Au up to 100 ppm. This method will determine the amount of gold recoverable through acid leaching prior to processing by the present invention.

3. Ag by HF-HNO3-HClO4 digestion with HCl leach, ICP-AES (inductively coupled plasma atomic emission spectroscopy) or AAS finish, measurement of recoverable Ag up to 1,500 ppm. This method will determine the amount of silver recoverable through acid leaching prior to processing by the present invention.

4. Au by accelerated cyanide leach using "Leachwell" reagent with AAS finish, measurement of recoverable Au up to 300 ppm. This method will determine the amount of gold recoverable through cyanide heap leaching.

At the conclusion of the control testing for each sample, the efficacy of acid leaching for gold, silver and precious metal and cyanide leaching for gold can be calculated as follows.

1. CTR1—Control Test 2 Au ppm/Control Test 1 Au ppm=Percent of Au recoverable by acid leaching prior to processing by the present invention.
2. CTR2—Control Test 3 Ag ppm/Control Test 1 Ag ppm=Percent of Ag recoverable by acid leaching prior to processing by the present invention.
3. CTR3—Control Test 4 Au ppm/Control Test 1 Au ppm=Percent of Au recoverable by cyanide leaching prior to processing by the present invention.

These results provide the baselines, hereinafter referred to as Control Test Ratios 1, 2 and 3 (CTR1, CTR2, and CTR3). After each of the subsequent processing steps, the resulting ore sample fractions will be evaluated with the same battery of tests, measuring the progressive increase in the efficiency of these extraction methods after the specified process step.

Gravimetric Separation—Each sample will be mixed into 1% to 25% solids slurry, by weight, using the apparatus of the present invention as hereinbefore described for slurry mixing. The slurry will then be transferred to separatory funnels as required by sample and funnel sizes and settled for 1 to 24 hours or more, as required for solids content settling and differentiation. The resulting layers of settled ore particulates with like physical properties of color, texture, particle size and layer sequence will be isolated and dried. Each layer may contain a different proportion of recoverable gold, silver or other precious metals and may respond differently to the aforementioned extraction methods. Each layer will be identified as a new sub-sample and each sub-sample will be tested again as in the control testing. This battery of tests will yield test ratios similar to the Control Test Ratios, and will be referred to as the GS Test Ratios 1, 2 and 3 (GSTR1, GSTR2 and GSTR3.) Comparison of these results with the corresponding Control Test Ratios (CTR1 to GSTR1, etc.) provides a measure of the utility of this processing step. It is anticipated that this step will provide a low cost means to reduce the amount of ore to process further and will aid sample characterization.

Processing of the Apparatus of the Present Invention—Each sub-sample is preferably mixed into 1% to 25% solids slurry, by weight, using the apparatus of the present invention as hereinbefore described for slurry mixing. One of the bubble collapse milling methods utilizing the apparatus of the present invention as described hereinbefore is implemented to process the sample. Detention, processing or recirculation time may be variable as required or pre-determined for use with a particular sample. Batch detention for 1 hour or recirculation for that amount of time required to allow each particle at least 1 pass or as many as 10 passes through the bubble collapse mill subsystem would likely represent useful test processing intervals.

Process method selection, implementation and duration would preferably be standardized prior to a particular set of comparative ore trials to insure statistically significant and experimentally valid comparative processing and analysis.

After this, the processed ore sample would be wet sieved through a US sieve size number 400—processing is complete if 85% of sample, by weight, passes through the sieve. If the material fails to pass the sieve test, it would be remixed into slurry and subjected to repeat processing with the apparatus of the present invention as hereinbefore described. After the second processing interval, the processed ore sample would be test sieved again as hereinbefore described, dried, and the resulting particle distribution by weight of material above and below the target size—US sieve 400 or 35 μm—would be measured, recorded and correlated with changes in extractability, these results to be used to measure the efficacy of the process of the present invention.

Each sub-sample processed with the apparatus of the present invention would again be evaluated using the four tests as described above in control testing, yielding test ratios similar to the control test ratios, referred to as the post milling test ratios 1, 2 and 3 (PMTR1, PMTR2 and PMTR3.) Comparison of these results with the corresponding control test ratios and gravitational separation test ratios (CTR1 to GSTR1 to PMTR1, etc.) provides a measure of increase in recoverable gold, silver and precious metal after processing with the apparatus of the present invention.

Final Evaluation—At the conclusion of processing for each sub-sample, the expected efficacy of the bubble collapse milling process of the present invention can be determined using the following calculations:

PMTR1—PM Test 2 Au ppm/PM Test 1 Au ppm=Percent of Au recoverable by acid leaching after processing by the present invention.

PMTR2—PM Test 3 Ag ppm/PM Test 1 Ag ppm=Percent of Ag recoverable by acid leaching after processing by the present invention.

PMTR3—PM Test 4 Au ppm/PM Test 1 Au ppm=Percent of Au recoverable by cyanide leaching after processing by the present invention.

By the present invention, comparison can be made between bubble collapse milling to ball milling, inert media milling, vibratory milling, or another type of milling as a preparatory step in an existing or contemplated process of gold, silver or other precious, semi-precious or otherwise recoverable metal, elemental or compound ore extraction or separation.

The present invention also provides a system and method to adapt to and control bubble collapse mills of various types provided with or without intrinsic advanced process controls. The present invention is designed for compatibility with the mill subsystem as depicted herein or another type of bubble collapse mill based on any method of forming and collapsing bubbles under supervisory control, including methods implementing ultrasonic, lasers, hydrodynamic vortices or fittings, hydrodynamic pumping or pressure manipulation, or some combination or hybrid method. Each of the various aforementioned bubble collapse systems and methods has a different set of parameters for effective control and can be partially or fully automated in a particular physical implementation of the bubble collapse system and method. To accommodate this variety in potential bubble collapse mill systems, methods and implementations, the present invention's design includes interconnected, interoperable, componentized, subsystems whose primary operating parameter values can be sourced from the subsystems themselves, a central controller or the bubble collapse mill. In this way, a mill that is outfitted for self regulation and self optimization can direct the apparatus to provide functions and operating conditions to support this self regulation. Where a mill subsystem has no intrinsic regulation capacity, the subsystems of the present invention or central controller can provide the operational parameter value regulation required to optimize the mill performance.

The present invention also provides apparatus and methods to correlate the bubble collapse subsystem chemical catalysis, milling performance, power usage, subsystem operational pressure, flow and temperature as these parameter values require modification during the operation of the present invention. As the milled ore and aqueous media are subjected to processing using the apparatus of the present invention, chemical and physical changes, such as oxidation of carbonaceous or sulfide ore compounds, dissolution of ore solids, production and dissolution of product gasses and ore particle size reduction, cause changes in the performance of the apparatus of the present invention such that initial operational parameter value ranges, process variable selections and setpoints may no longer provide optimal performance. The apparatus of the present invention can contain sensors and components and the control logic includes algorithms to identify and to select for control of those process variables whose control and ranges provide optimal apparatus productivity. In addition, the control system provides logic to both change operational setpoints and to drive control of the system based on any of the measured process variables, based on the degree to which control of a selected process variable provides predictable process control. In addition, the control system permits a selected controlling process variable's range to have a variable statistical weighting when used in combination with other process variables or when compared to other process variables. In this way, chemical reactivity and milling performance as a function of power consumed can be controlled by that process variable or variables across a selected range and with setpoints so that control and performance can be optimized and maximized.

The present invention also provides a control system that can act as an analytical tool, determining the optimal operational parameter values required to achieve a target ore particle size reduction rate and, where desired, to catalyze chemical ore degradation, using the least amount of energy/volume. The controller allows automatic sequential execution of operational trials of the present invention using electronically stored apparatus setpoints such as system flow rate, pressure, power or other setpoint values or value ranges that may produce desirable performance characteristics of the apparatus of the present invention, as required by a particular application of the present invention. The controller automatically recalculates and varies the actual operational setpoints using the originally input setpoint values or value ranges and value modification algorithms residing in the controller. It concurrently records and subsequently analyses the trial operational results, reporting those setpoint combinations yielding desirable or best fit operational characteristics using controller residing result evaluation algorithms.

The present invention also provides a control system to evaluate whether a particular ore is responding to the process. In particular, the control system can manipulate process variables dynamically over time. In this manner, operational parameters external and internal to the bubble collapse mill that have the most significant or desirable impact on the efficacy, particle reduction rate, particle size distribution, chemical degradation capacity, power consumption or other measured variable can be identified, controlled and optimized during and as a consequence of system operation. Yet another aspect of the present invention provides bubble collapse milling of ores and a control system that interacts with an external system to evaluate and manipulate the processing of an ore during bubble collapse milling.

The present invention also provides a mechanism to catalyze oxidation of refractory, sulfide, carbonaceous or other preg-robbing ores (ores that absorb or bind with precious metals) and a mechanism to evaluate the effect of this simultaneous milling and oxidation of an ore on the extraction of gold, silver and precious metal after bubble collapse milling using conventional recoverable metal extraction lixiviants, separations or methods: Cyanide extraction, for example, is inhibited by the presence of oxidizable minerals and compounds in gold or silver bearing ores. Bubble collapse milling of ore/water slurries catalyzes oxidation of these compounds by splitting water into hydroxyl radicals and other oxidizing compounds—without the application of external heat or pre-treatment with roasting—and increases the amount of recoverable gold using cyanidation or acid extraction methods to acceptable percentages.

The present invention also provides methods and apparatus that use a collapsing gas and water vapor containing bubble in water as a catalyst for reactions between the water vapor or aqueous milling media and minerals or compounds dissolved in the aqueous milling media or present as suspended particulates or solids in the aqueous milling media, or as a catalyst for reactions between the suspended particles, aqueous milling media, water or other vapor, oxygen, hydrogen or other gasses contained in the bubble and the aqueous milling media, dissolved oxygen, dissolved hydrogen, hydroxyl radicals or other related chemical pathway oxidizers and the solids or particulates suspended in the bubble containing aqueous milling media.

The present invention also provides an ore micron milling apparatus and control system for complete of reagents, reactants, solids, liquids and gasses added to or evolved during the present invention's operation as a mill. The present invention provides several closed loop processing circuit options and batch processing options for ore and slurry milling that may be entirely sealed, such that no solid, liquid or gas is emitted during milling. The apparatus of the present invention provides components to monitor and separate gasses, liquids and solids during and after processing using methods that permit controlled redirection of the effluent substances, including methods to control dissolved and headspace gasses, liquid fractions and solid fractions. The apparatus of the present invention can also degrade water contaminants and react and degrade solid, liquid and gasses in a process of the present invention run separate from the ore milling run. In this way, the apparatus of the present invention can operate in a zero emission mode and can retain and recycle feedstock and product solids, liquids and gasses. Combustible by-products created during operation of the invention, such as methane, can be captured for subsequent sale and/or used to realize additional value.

The present invention also provides a method to characterize a particular gold or silver metal bearing ore. The mineral matrix composition and structure of a particular gold or silver bearing ore affects can be partially or totally deduced by the response of a particular ore to a separation, milling or extraction operation or step as described by the method of the present invention. The extraction efficiencies and changes in the extraction efficiencies after each step in the method of the present invention—calculated as part of the method—provide a means to identify a particular ore and a means to compare one ore to another. Consequently, the response of a particular ore to processing with the apparatus of the present invention and testing with the method of the present invention can be used as a property to identify a particular ore, to compare one ore to another, or to differentiate one ore from another.

The present invention also provides a hydrometallurgical milling system suitable and readily adaptable for connection to vat leaching or other batch or closed circuit ore extraction methods where lixiviant use is implemented. The apparatus of the present invention provides means to physically connect, via the existing apparatus piping, the present invention to any hydrometallurgical system or process. In addition, the present invention provides a readily adaptable external system interconnectable control system, making connection and interoperation between the apparatus of the present invention and its control system and an external process and its control system simple and convenient.

It will be understood that the embodiments described herein are merely exemplary and that a person skilled in the art may make many variations and modifications without departing from the spirit and scope of the invention. All such variations and modifications are intended to be included within the scope of the invention as defined by the appended claims.

What is claimed is:

1. A method for bubble collapse milling comprising the steps of:
   pumping a slurry including ore particulates into a bubble collapse mill;
   activating the bubble collapse mill to process the slurry;
   recirculating the slurry through the bubble collapse mill at a controlled pressure using a circulation pump;
   monitoring a process parameter associated with processing of the slurry using a controller and at least one sensor; and
   adjusting operation of the bubble collapse mill based upon monitoring of the parameter.

2. The method of claim 1, wherein the step of monitoring the process parameter associated with processing of the slurry comprises monitoring at least one of temperature, pressure, flow rate, power, percent Hydrogen ion (pH), total dissolved solids (TDS), oxidation reduction potential (ORP), or dissolved oxygen.

3. The method of claim 1, further comprising stopping operation of the bubble collapse mill using the controller.

4. The method of claim 3, further comprising pumping the slurry out of the bubble collapse mill for subsequent extraction of the ore particulates from the slurry.

5. The method of claim 1, wherein the step of recirculating the slurry through the bubble collapse mill at the controlled pressure comprises recirculating the slurry through the bubble collapse mill at a low pressure using the circulation pump.

6. The method of claim 1, further comprising capturing combustible by-products from the bubble collapse mill.

7. The method of claim 6, wherein the step of capturing the combustible by-products from the bubble collapse mill comprises capturing methane from the bubble collapse mill.

8. The method of claim 1, further comprising neutralizing lixiviants in the fluid using the bubble collapse mill.

* * * * *